United States Patent [19]

Hawkins et al.

[11] Patent Number: 4,855,564

[45] Date of Patent: Aug. 8, 1989

[54] LASER BEAM ALIGNMENT AND TRANSPORT SYSTEM

[75] Inventors: Phillip J. Hawkins; William H. Kasner, both of Penn Hills Township, Allegheny County; Vincent A. Toth, Penn Township, Westmoreland County; Mariann C. Stroster, Hempfield Township, Westmoreland County, all of Pa.

[73] Assignee: Westinghouse Electric Corp., Pittsburgh, Pa.

[21] Appl. No.: 197,176

[22] Filed: May 23, 1988

[51] Int. Cl.⁴ .............................................. B23K 26/02
[52] U.S. Cl. ........................... 219/121.78; 219/121.63; 219/12.64; 219/121.74; 219/121.79; 219/121.64
[58] Field of Search ............... 356/153; 219/121.63, 219/121.64, 121.74, 121.76, 121.78, 121.79, 121.6, 121.85

[56] References Cited

U.S. PATENT DOCUMENTS

| | | | |
|---|---|---|---|
| 3,992,961 | 11/1986 | Saito | 74/409 |
| 4,146,329 | 3/1979 | King et al. | 356/152 |
| 4,379,624 | 4/1983 | Miller et al. | 350/486 |
| 4,618,759 | 10/1986 | Muller et al. | 219/121.75 |
| 4,626,649 | 12/1986 | Dupeyrat et al. | 219/121.78 |
| 4,659,916 | 4/1987 | Muller et al. | 219/121.79 X |
| 4,667,081 | 5/1987 | Turin et al. | 219/121.79 |
| 4,668,088 | 5/1987 | Quinque et al. | 356/138 |
| 4,675,501 | 6/1987 | Klingel | 219/121.72 |
| 4,694,136 | 9/1987 | Kasner et al. | 219/121.64 |
| 4,694,137 | 9/1987 | Hawkins et al. | 219/121.63 |

Primary Examiner—C. L. Albritton

[57] ABSTRACT

A laser welding system is disclosed in which a high power laser produces the laser beam for delivery to a weld site. A transmitter is optically coupled to the laser and directs the laser beam to a spatially separated receiver. The receiver has an input alignable for receiving the directed laser beam and including optics for delivering the laser beam to the weld site. A pair of directable beam deflectors are employed for aligning the transmitter and the receiver. A pair of steering deflectors introduce the laser beam into the transmitter. A selectable mounting allows the laser to be secured at various orientations relative to the steering mirrors and the weld site. The transmitter and the receiver each have a detector positioned for receiving an alignment laser beam at a point which indicates alignment. The transmitter and the receiver include steppable drives for positioning their respective deflectors. The alignment laser is aligned at a starting block on the receiver detector and the transmitter detector. The steppable drives are each driven away from the starting block by an amount sufficient to eliminate backlash when the drives are reversed. Each steppable drive is then reversed and driven in one direction to bring the alignment laser beam back to the starting block and thereafter into the alignment position in a series of sequential alignment steps.

31 Claims, 17 Drawing Sheets

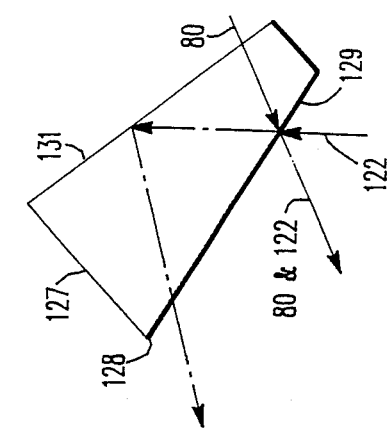
FIG. 2A
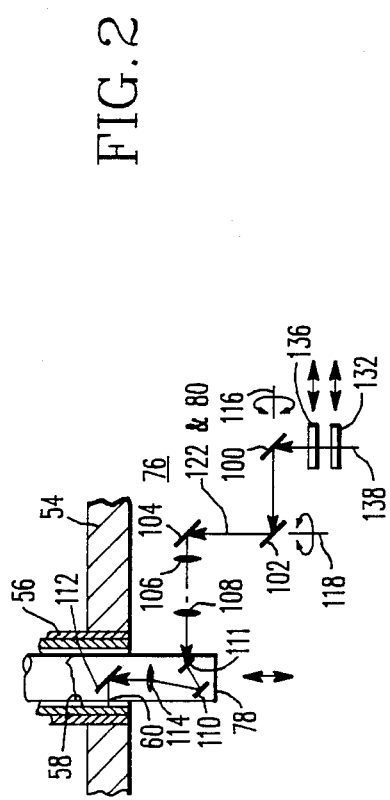
FIG. 2
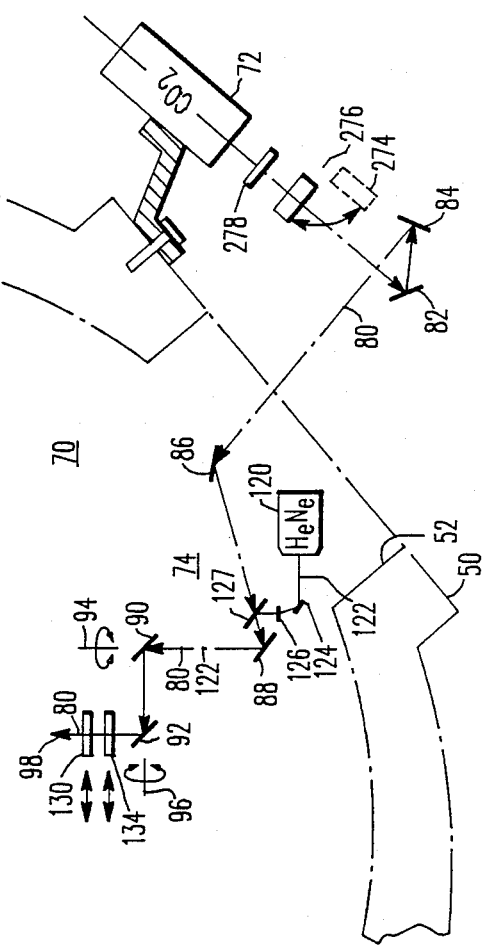

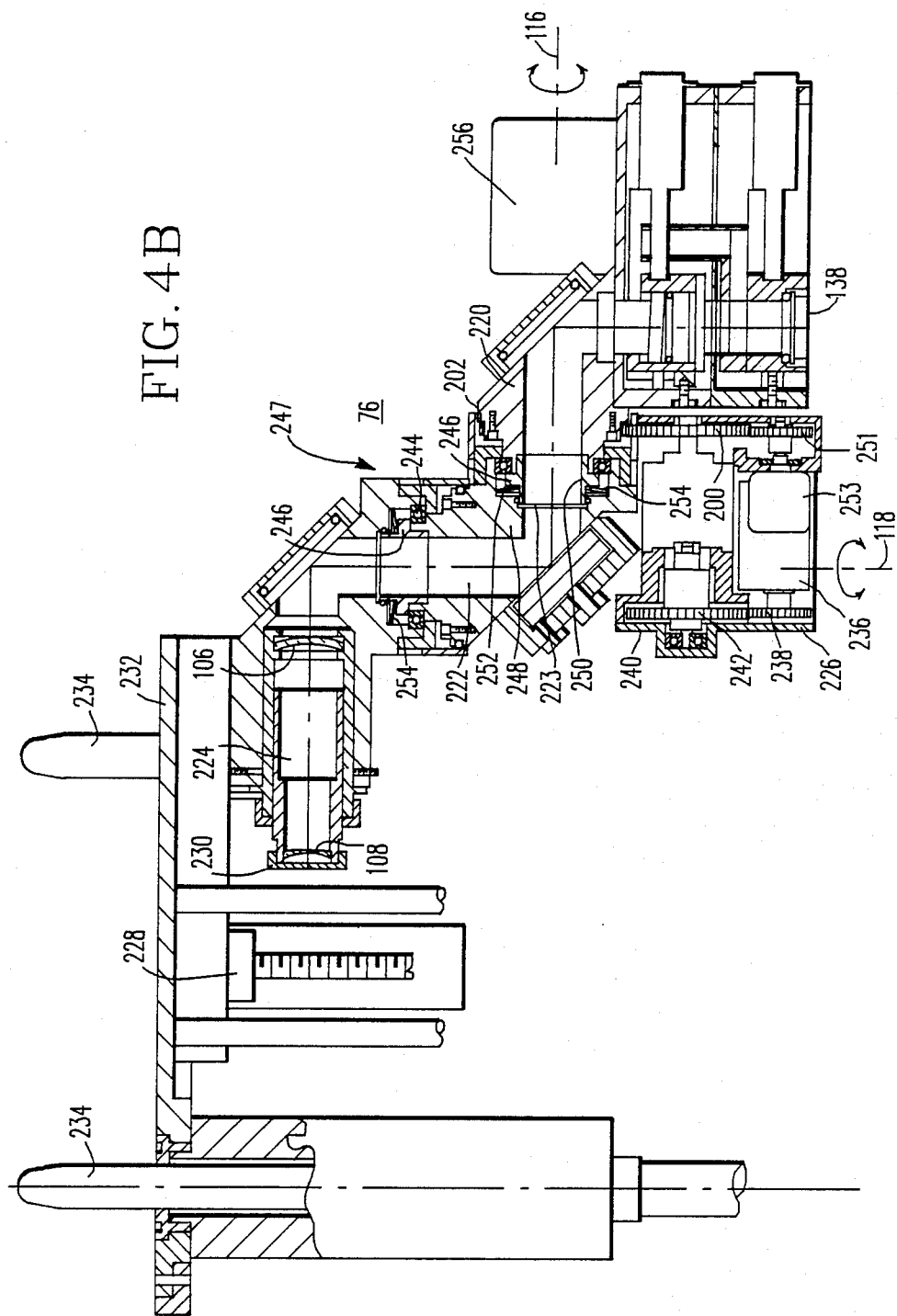

LASER BEAM ALIGNMENT AND TRANSPORT SYSTEM

CROSS REFERENCE TO RELATED PATENTS AND APPLICATIONS

This application is related to Kasner et al., U.S. Pat. No. 4,694,136 and Hawkins et al., U.S. Pat. No. 4,694,137 which issued Sept. 15, 1987 and copending applications Ser. No. 821,673 filing date Jan. 23, 1986 entitled "Laser Beam Alignment and Transport System" in the names of Hawkins et al., and Ser. No. 069722 filing date July 6, 1987, entitled "Flexible Laser Welding Head for Sleeve to Tube Welding" in the names of Kasner et al.

BACKGROUND OF THE INVENTION

This invention relates to a laser welding apparatus and more particularly to a laser beam alignment and transport system for use in welding apparatus adapted to weld a sleeve within a tube of a nuclear steam generator.

Various approaches to laser welding of sleeves within tubes of tube type heat exchangers and nuclear steam generators in order to effect repairs of defective tubes are described in the above cross-referenced documents. There are difficulties associated with physically fitting such welding apparatus within the channel or header of nuclear steam generators. There are also difficulties associated with aligning the high power laser with the target or weld site.

FIG. 1 shows a prior art laser welding system illustrated in each of the above cross-referenced documents. For the sake of this discussion only, reference to Hawkins et al. U.S. Pat. No. 4,694,137 will be made. However, it should be understood that the Kasner et al. patent and the Hawkins et al. application contain similar subject matter.

The beam transport system 10 depicted in FIG. 1 directs the beam from a high power laser 12 from a laser beam transmitting means, such as a beam transmitter 14, to a remote laser beam receiving means, such as a beam receiver 16, with no physical connection therebetween. Apparatus associated with the beam transport system 10 is used to align the components to direct the beam along an optimum beam path. Proper laser alignment assures that the high power beam does not improperly impinge on any components of the beam transport system 10 or the steam generator 18 to prevent damage which could thereby result. Initial alignment of the beam transport system utilizes a lower power HeNe laser 20 as a source of visible light in conjunction with low power beam detectors 22 and several video cameras 24 or other visual observation devices.

Once the transmitter 14 and the receiver 16 are aligned, for example as set forth in Hawkins et al., the high power laser 12 is aligned with the transport system using appropriate detectors and the high power laser 12 is then actuated and directed to laser beam transmitter 14 which sends the beam to the remote laser beam receiver 16. The diameter of the high power beam is reduced and recollimated by lens system 26 and redirected towards the welding head 28. The beam is directed at a sleeve 30 within a tube 32 of the steam generator 18. The welding head 28 is rotated during the welding operation to create a leak tight seal between the sleeve 30 and the tube 32.

In accordance with the arrangement illustrated in Hawkins et al. it is necessary to install and align the high power laser 12, the laser transmitter 14 and the laser receiver 16 at each site prior to proper operation of the system. Installation and alignment is often hampered by the fact that equipment around and near the nuclear steam generator 18 restricts access thereto. Also, steam generators at various locations are often different and the setup of the equipment and alignment procedures are often unique to each different type of steam generator model.

In addition to problems associated with individual steam generators, it is also difficult to align the high power laser 12 with the weld site in the sleeve 30. The high power laser 12 is physically located about ten feet or more from the tube or tubes 32 to be repaired.

As is apparent from Hawkins et al. and the other related applications, the transmitter 14 and the receiver 16 have movable wrists 42 which carry beam deflecting mirrors 36. The wrists 42 are driven into selected positions by means of motor and gear arrangements 46 and 48 described in detail in Hawkins et al. Accurate orientation and positioning of the wrists 42 is hampered by the inherent inaccuracy associated with gears. Backlash associated with the gears 48 may be calculated mathematically and refined experimentally so that the wrists 42 may be oriented more accurately. For example, the motors 46 may be stepper motors having many steps per second degree of rotation. However, because alignment of the laser must be precise, even the gear lubrication must be considered. When one or more of the motors 46 is reversed, for example, the lubricants for each of the gears 48 contact before the gear teeth contact. Thus, the wrist does not respond precisely and immediately to the reversal of the gear 48. When a sufficient amount of lubricant is displaced so that the gears 48 firmly contact each other then wrist 42 movement may be more accurately controlled through motor 46 movement. The term soft backlash is used to describe the range of gear travel necessary to displace lubricant between two gears so that the response of the gears may be predictable. The term hard contact refers to the condition of firm contact between gear teeth. Movement required to move from the soft backlash to the hard contact condition is determined and recorded for use during actual alignment processes. However, soft backlash varies depending upon the type of movement initialized by the motor. If a particular motor and gear set 46,48 is operated frequently or for a relatively prolonged period over a particular time interval, the soft backlash will be different than if the same motor and gear set 46,48 is operated once over a short time interval. Another significant factor is whether the motor and gear set 46,48 has been operated recently, i.e., within the previous few minutes. Thus, the soft backlash tends to drift, which makes accurately aligning the laser beam extremely difficult.

It has also been found that the operation of a motor 46 and gear 48 creates a bending moment or deflection of the wrist 42 with which the particular motor and gear is associated. Deflection of the wrist 42 thus creates an additional complication and difficulty in connection with aligning the high power laser 12.

SUMMARY OF THE INVENTION

The invention relates to a laser welding system in which a high power laser produces the laser beam for delivery to a weld site. A transmitter is optically coupled to the laser and directs the laser beam to a spatially separated receiver. The receiver, optically coupled to the transmitter, has an input for receiving the directed laser beam and means for delivering the laser beam to the weld site. A pair of directable beam deflecting means, operable in perpendicular planes, are employed for aligning the output of the transmitter and the input of the receiver. A pair of steering deflectors at the input of the transmitter direct the laser beam towards the directable beam deflecting means of the transmitter. A means is provided for selectively mounting the laser at various orientations relative to the weld site. A means also provided in the transmitter for selectively adjusting the orientation of the transmitter to an orientation corresponding to the orientation of the laser.

Another aspect of the invention is a method for aligning the laser transmitter with a laser receiver. The transmitter and the receiver both have a detector positioned for receiving an alignment laser beam at a point which indicates alignment. Both transmitter and receiver also include steppable drive means for positioning their corresponding deflecting means. The drive means has inherent backlash which is manifested by reversal of the rotation. The alignment laser is aligned at a starting block on each corresponding detector on the receiver and the transmitter. The drive means for the transmitter and the drive means for the receiver are each driven away from the starting block and the alignment position by an amount sufficient to eliminate backlash in one direction. Each drive means is then reversed and directed in a single direction to bring the alignment laser beam back to the starting block and thereafter into the alignment position in a sequential repetitive series of steps with the drive means rotating in one direction only.

DESCRIPTION OF THE DRAWINGS

FIG. 2 is a schematic representation of a laser welding apparatus of the present invention, with housings, drives, bearings, and the like eliminated for clarity;

FIG. 2A is a detail of the beam combiner illustrated generally in FIG. 2;

FIGS. 4A and 4B are schematic side section elevations which taken together illustrate the laser welding apparatus of the present invention;

FIG. 6 is a side section elevation of a carrier or cam plate which supports portions of the welding apparatus of the present invention in a nuclear steam generator or the like;

DESCRIPTION OF THE INVENTION

Figure 1:
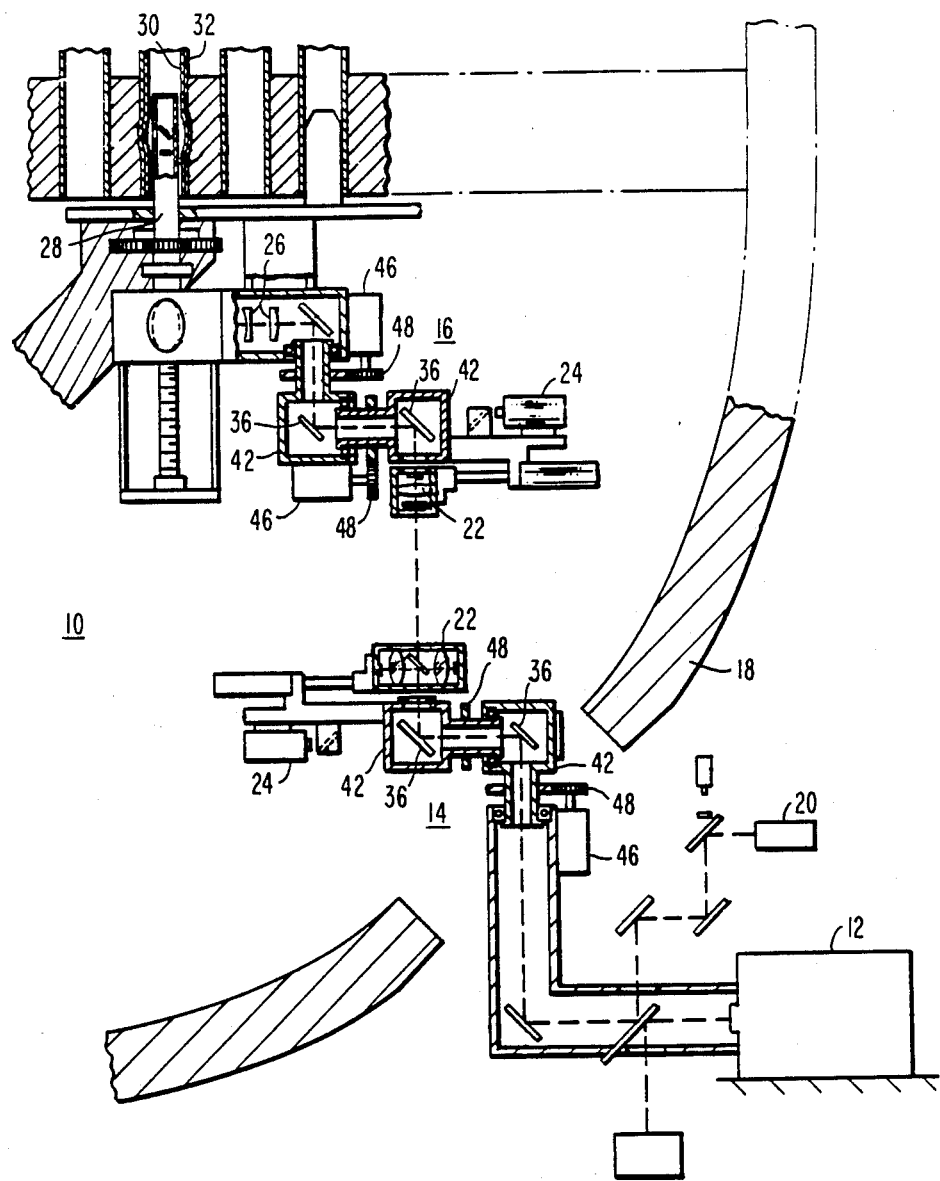
FIG. 1 is an illustration of a laser welding apparatus described in the related U.S. patent Hawkins et al. No. 4,694,137.

The apparatus of the present invention is intended to be used in repairing a nuclear steam generator 50 which is shown schematically in FIG. 2 as a fragmented portion of the header having a manway 52 in the lower end thereof and a tube sheet 54 with tubes 56 located in openings therein. Only one tube 56 is shown. In the repair of steam generator tubes, a sleeve 58 is located in the tube 56. In accordance with the present invention, the sleeve 58 is welded to the tube 56 by means of a circular or circumferential weld at a weld site 60.

A laser welding apparatus 70 according to the present invention includes a high power laser 72, a laser beam transmitter 74, a laser beam receiver 76 and a weld head 78. According to the invention, the laser 72 is a carbon dioxide laser capable of delivering about 1000 watts of power. When activated, the high power laser 72 produces a high power beam 80 which is directed through the transmitter 74 to the receiver 76 and then to the weld site 60 by means of the weld head 78.

The transmitter includes a pair of steerable mirrors 82 and 84. The mirrors 82 and 84 may be moved to adjust the position or direction of the beam 80. The transmitter 74 also includes a first deflecting mirror 86 in the path of the laser beam 80. A second deflecting mirror 88 and respective third and fourth deflecting mirrors 90 and 92 are located in the path of the laser beam as shown. The third deflecting mirror 90 is steerable or adjustable on its mount (not shown). In addition, the third deflecting mirror 90 is rotatable about an axis 94 which is shown as a vertical axis in FIG. 2. The fourth deflecting mirror 92 is rotatable with the third deflecting mirror 90 about the axis 94 and is also rotatable about an axis 96 which in FIG. 2 is shown as being horizontal. The laser beam 80 leaves the output 98 of the transmitter 74 as shown. The beam 80 may be directed from the output 98 upwardly and towards the receiver 76.

When the transmitter 74 and receiver 76 are properly aligned, the laser beam 80 is directed toward and deflected by fifth, sixth and seventh deflecting mirrors 100, 102 and 104. The deflecting mirror 104 directs the beam 80 through a lens system including a reducing lens 106 and a concave lens 108 toward the weld head 78, which itself includes two lower deflecting mirrors 110, and 111, a focusing lens 114 and one upper deflecting mirror 112. The upper deflecting mirror 112 directs the beam 80 towards the weld site 60. The fifth deflecting mirror 100 is rotatable about an axis 116 which is shown as a horizontal line in FIG. 2. The sixth deflecting mirror 102 (with the fifth deflecting mirror 100) is rotatable about a vertical axis 118. Thus, it is possible to align the transmitter 74 with the receiver 76 by manipulation of the mirrors 90, 92, 100 and 102 about their respective axes of rotation 94, 96, 116 and 118.

In order to facilitate the alignment of the transmitter 74 with the receiver 76, a lower power visible HeNe laser 120 is utilized. The HeNe laser 120 is mounted on the transmitter housing (not shown). The HeNe laser 120 produces a visible alignment beam 122. The HeNe laser 120 is arranged so that the alignment beam 122 is colinear with the high power beam 80 at the output 98 of the transmitter 74. The HeNe laser is aligned with the high power beam 80 in the following manner. Relatively small steering mirrors 124 and 126 are arranged in the vicinity of the second deflecting mirror 88 as shown. The HeNe laser 120 is directed at the first of the steering mirrors 124 and the beam 122 is deflected towards the second steering mirror 126 and then to a special reflective surface 128 which combines the HeNe beam 122 with the high power beam 80. The special reflecting surface 128 is a transparent window on zinc selenide beam combiner 127 which is located directly in the path of the high power beam 80 as shown and is about 99% transparent to the high power beam. The special reflecting surface 128 on combiner 127 is about 50% reflective of the HeNe beam 122. Thus, the HeNe beam 122 is redirected from the downstream side 129 of the combiner 127 in the same direction as the high power beam 80 and thus the two beams are combined and become colinear throughout the remaining portion of the transmitter 74 towards the output 98. The combiner 128 is wedge shaped as shown in FIG. 2A. The upstream side 131 and downstream side 129 are not parallel so that any HeNe laser reflections from the second surface 131 or downstream side of the combiner 127 are deflected from the main laser beam path 80-122.

The alignment beam 122 is used to locate the receiver 76 so that the high power beam 80 may be later directed thereat for the purposes of effecting a weld as hereinbefore described. The arrangement of the HeNe laser 120 as set forth is extremely convenient because the laser 120 is mounted and prealigned with the optics in the transmitter 74 so that separate alignment of the HeNe laser 120 and the high power laser 72 is simply and effectively achieved.

In accordance with the present invention, means are provided for detecting the high power laser beam 80 and the low power laser beam 122. In the transmitter 74, a high power detector 130 is located in the path of the high power beam 80 at the output 98 of the transmitter 74. A small portion of the high power beam 80 is directed at the high power detector 130 in order to determine whether the high power beam 80 is properly aligned at the output 98 of the transmitter. A high power detector 132 is also provided on the receiver 76 for assuring proper alignment of the high power beam 80.

Low power detector or receiver detector 134 is retractably mounted in the path of the low power beam 122 near the output 98 of the transmitter 74. The purpose of the receiver detector 134 is hereinafter described. A low power or transmitter detector 136 is retractably located in the path of the low power beam 122 near the input 138 of the receiver 76. The receiver detector 134 on the transmitter 74 detects the position of the receiver 76 relative to the transmitter 74. The transmitter detector 136 on the receiver 76 detects the position of the transmitter 74 relative to the receiver 76.

Figure 3:
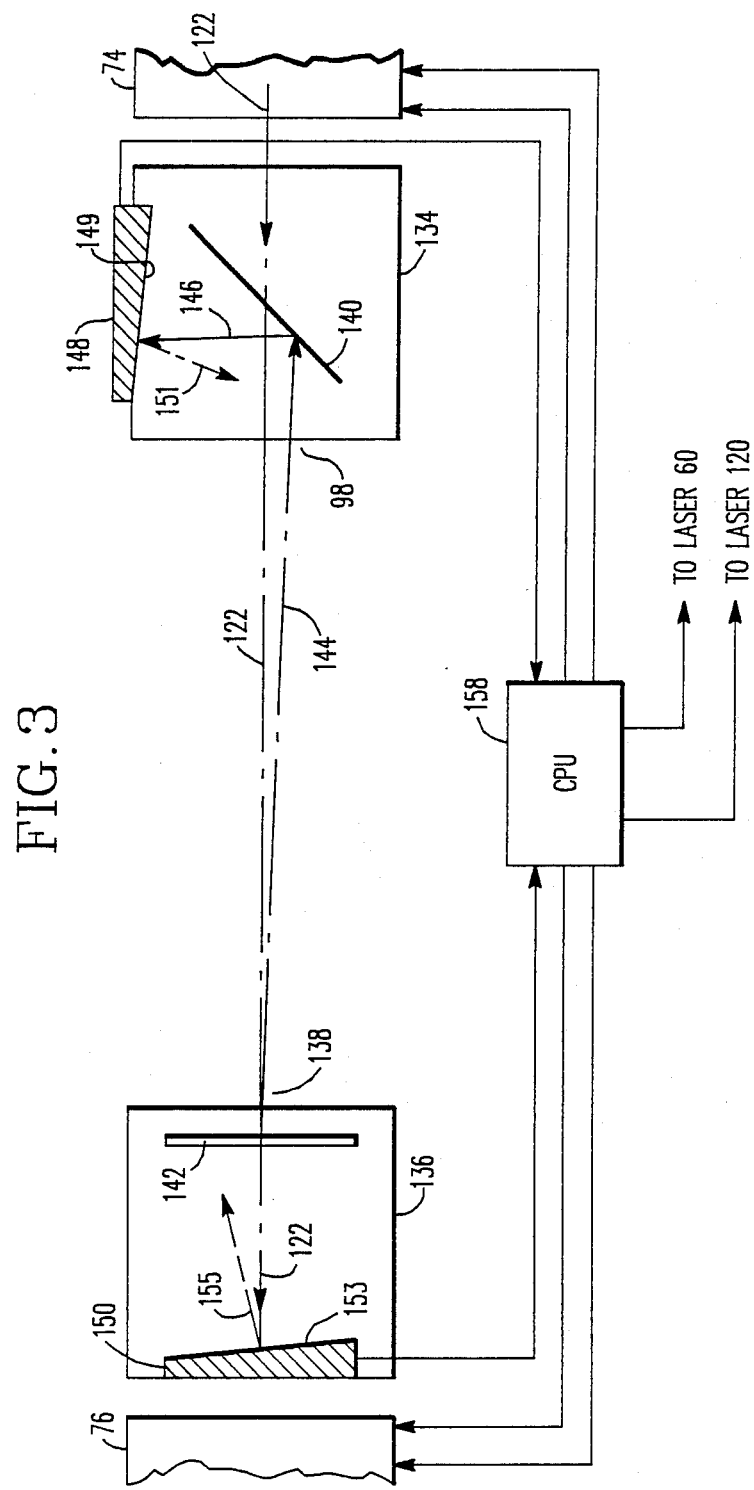
FIG. 3 is a schematic block diagram of an alignment apparatus and control system for the laser welding apparatus of the present invention.

FIG. 3 schematically illustrates the principle of operation of the transmitter detector 136 and the receiver detector 134. The receiver detector 134 is mounted near the output 98 of the transmitter 74. The transmitter detector 136 is mounted near the input 138 of the receiver 76. The low power beam 122 is directed towards the receiver 76 as shown in FIG. 3. The low power beam 122 is directed through the receiver detector 134 which includes a semi-transparent mirror 140. The mirror 140 allows a portion of the low power beam 122 to pass therethrough and cross the gap between the transmitter 74 and receiver 76. The transmitter detector 136 has a semi-transparent or partially reflecting window 142 which reflects a portion of the incoming low power beam 122 as reflected beam 144. The reflected beam 144 strikes the semi-transparent window or mirror 140 and is deflected as low power beam 146 toward the receiver photo detector 148. The receiver photo detector 148 produces an output signal which characterizes the alignment of the transmitter 74 with the receiver 76. When the partially reflecting window 142 is perpendicular to the incoming low power beam 122, which indicates that the transmitter 74 and receiver 76 are in alignment, the receiver detector 148 produces an appropriate signal.

The partially reflecting window 142 allows a portion of the low power beam 122 to pass therethrough and strike a transmitter photo detector 150, which produces a signal in response to the low power beam indicative of the position of the transmitter 74 with respect to the receiver 76. When the transmitter 74 is aligned properly with the receiver 76, the output of the transmitter photo detector 150 produces an appropriate signal. The front surface 149 of the receiver photo detector 148 is slanted, as shown, in order to scatter any light 151 which may otherwise be reflected in the optical path of the system described in FIG. 3. Similarly, the front surface 153 of the transmsitter photo detector 150 is slanted in order to scatter light 155.

The process of aligning the transmitter 74 with the receiver 76 as outlined above is iterative and may require more than one attempt. However, the process yields accurate results. In order to enhance the accuracy and speed of the process of alignment, a central processing unit (CPU) 158 is provided. The CPU receives outputs from each of the detectors 148 and 150 which information is processed in a manner hereinafter described. Outputs of the CPU control the position of the beam deflecting mirrors 90, 92, 100 and 102 in order to align the output 98 of the transmitter 74 with the input 138 of the receiver 76.

Figure 4A:
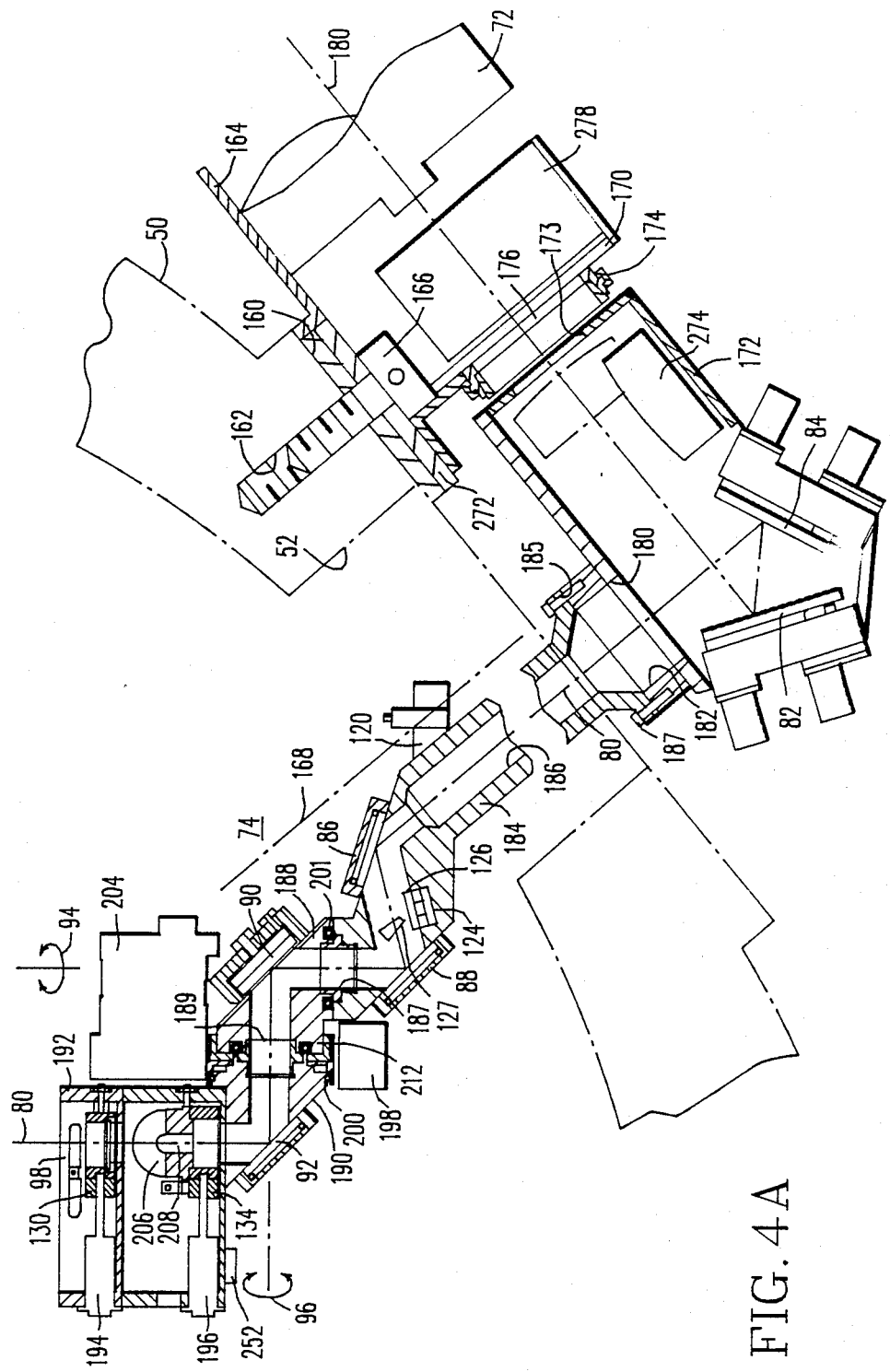

Referring to FIG. 4A, the high power laser 72 is attached to the steam generator 50 at manway flange 160 which has a bolt hole circle 162 (only one bolt hole is shown). A bracket 164 secures the laser 72 to the manway flange 160 by means of three bolts 166 (only one of which is shown). The laser 72 may be positioned in any orientation about the center line 168 of the manway 52 simply by locating the bracket 164 and bolts 166 at a location. Thus, the laser may be positioned at any convenient location which avoids local obstructions. A mirror box supporting bracket 170 is attached to the laser supporting bracket 164 as shown. A mirror box 172 is coupled to the supporting bracket 170 by a retractable mating coupler 174. The bracket 170, the mirror box inlet 173 and the retractable coupler 174 have aligned apertures shown generally by reference numeral 176 which allows the high power laser beam 80 to enter the mirror box 172. The outlet 180 of the mirror box 172 has an appropriate aperture 182 and a bolt circle 185. A mirror chamber 184 has an interior chamber 186 aligned with the outlet 180 of the mirror box 172. The mirror chamber 184 also has a bolt circle 187 which matches the bolt circle 185 of the mirror box the purpose of which is described hereinafter. Apertures, not shown, formed in the mirror chamber 184 provide an inlet for the low power laser beam 122. The mirror chamber 184 has suitable mountings for securing the first and second mirrors 86 and 88 therein and the small steering mirrors 124 and 126. The special reflector or combiner 127 is located in the beam path 80 of the mirror housing 184, as shown, to combine the low power beam 122 with the high power beam 80 at the downstream surface 129 of the special reflector 128 (shown in detail in FIG. 2A).

A first wrist assembly 188 is located at the outlet 187 of the mirror chamber 184 as shown. The first wrist assembly 188 is rotatable about the axis 94. The third mirror 90, is adjustably mounted in the first wrist 188 for initial alignment purposes. The second wrist assembly 190 is coupled to the outlet 189 of the first wrist assembly 188 and is rotatable about the axis 96. A detector housing 192 supports the high power detector 130 and the receiver detector 134 therein. Actuator 194 is coupled to the high power detector for retractably locating it in the path of the high power beam 80. Actuator 196 retractably locates the receiver detector 134 in the path of the low power beam 122. A first wrist drive 198 is mounted to the mirror chamber 184 and has an output gear 200 which engages a ring gear 201 on the first wrist assembly 188. The drive 198 reversibly drives the first wrist assembly 188 through an angle of 360° about the axis 94. A drive 204 is mounted on the first wrist 188 and is similarly arranged to reversibly drive the second wrist 190 through an angle of 360° about the axis 96.

The receiver detector 134 carries the receiver mirror 140 on a support 206 which has a relatively small aperture 208. The small aperture 208 deflects any extraneous light in the system caused by multiple reflections in the beam combiner 127.

The receiver 76 (FIG. 4B) is similar in many ways to the transmitter 74. A third wrist assembly 220 at the inlet 138 of the receiver 76 is rotatable about the axis 116. A fourth wrist 222, coupled to the outlet 223 of the third wrist 220, is rotatable about the axis 118, as shown. The fourth wrist 222 is coupled to a beam reducer assembly 224 which includes the beam reducing lens 106 and the collimating lens 108 detailed in FIG. 2. The third and fourth wrists 220, and 222 are suitably driven by reversible drives. In FIG. 4B, the third drive 226 drives the third wrist 220 about the axis 116. The fourth drive 247 for driving the fourth wrist 222 is obscured behind the fourth wrist 222. Suitable gear arrangements are provided for driving the third and fourth wrists, and these are similar to the gear arrangements discussed with respect to the transmitter portion. A further discussion is deemed unnecessary.

Figure 6:
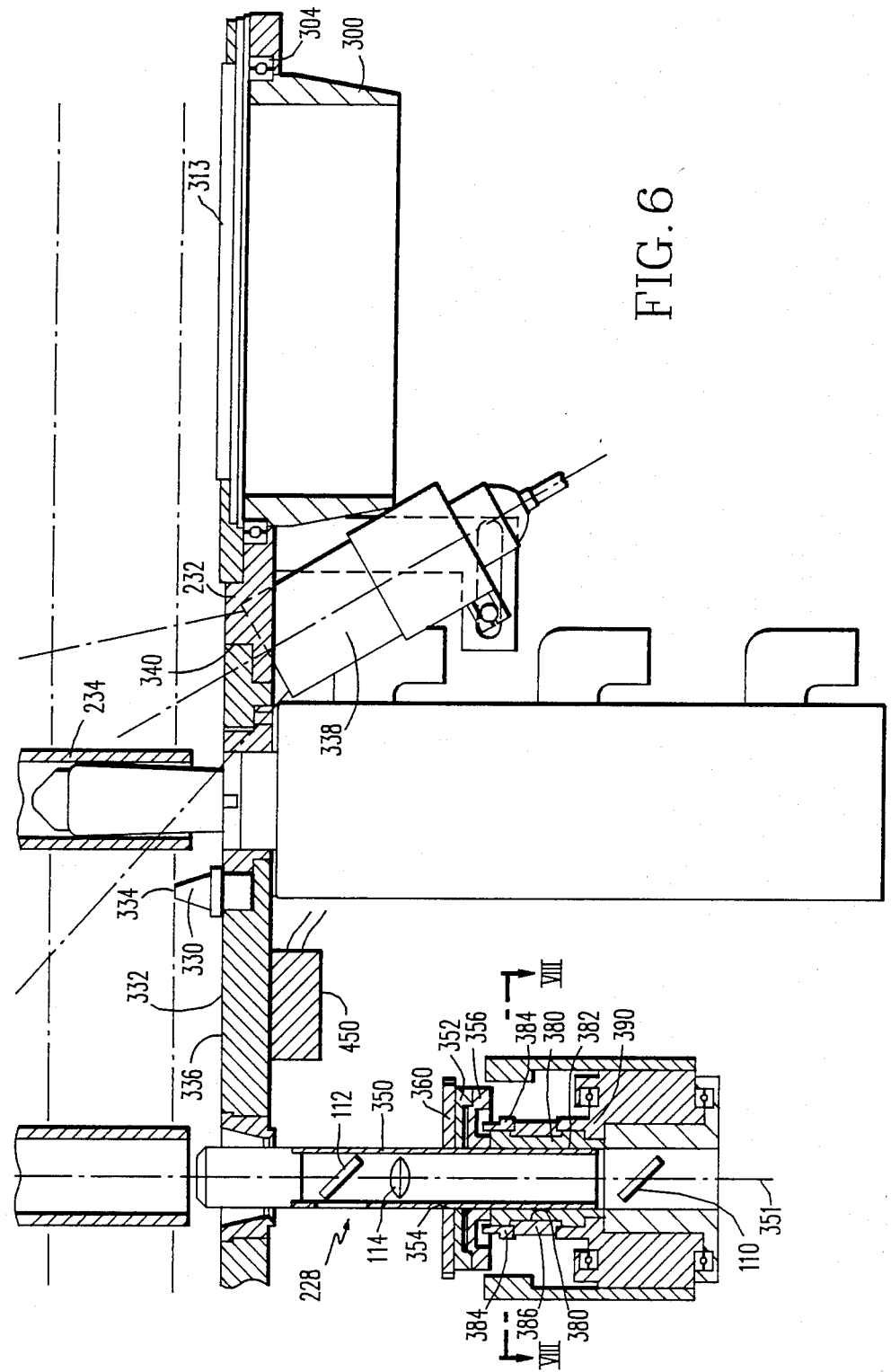

Welding head assembly 228 is retractably located near the outlet 230 of the beam reducer 224. The weld head is reciprocally movable between a lower retracted position, as shown in FIG. 6, and an upper extended position for allowing the high power beam 80 to be directed at the weld site as hereinbefore described (FIG. 2). The receiver 76 and the weld head assembly 228 are mounted on a cam plate 232 which includes pneumatically operated cam locks 234. The cam locks 234 engage open tube holes in the tube sheet (FIG. 2) in a manner known in the art. Fixed to the cam plate 232 is a microphone 450 which provides means for monitoring the welding process.

Figure 5:
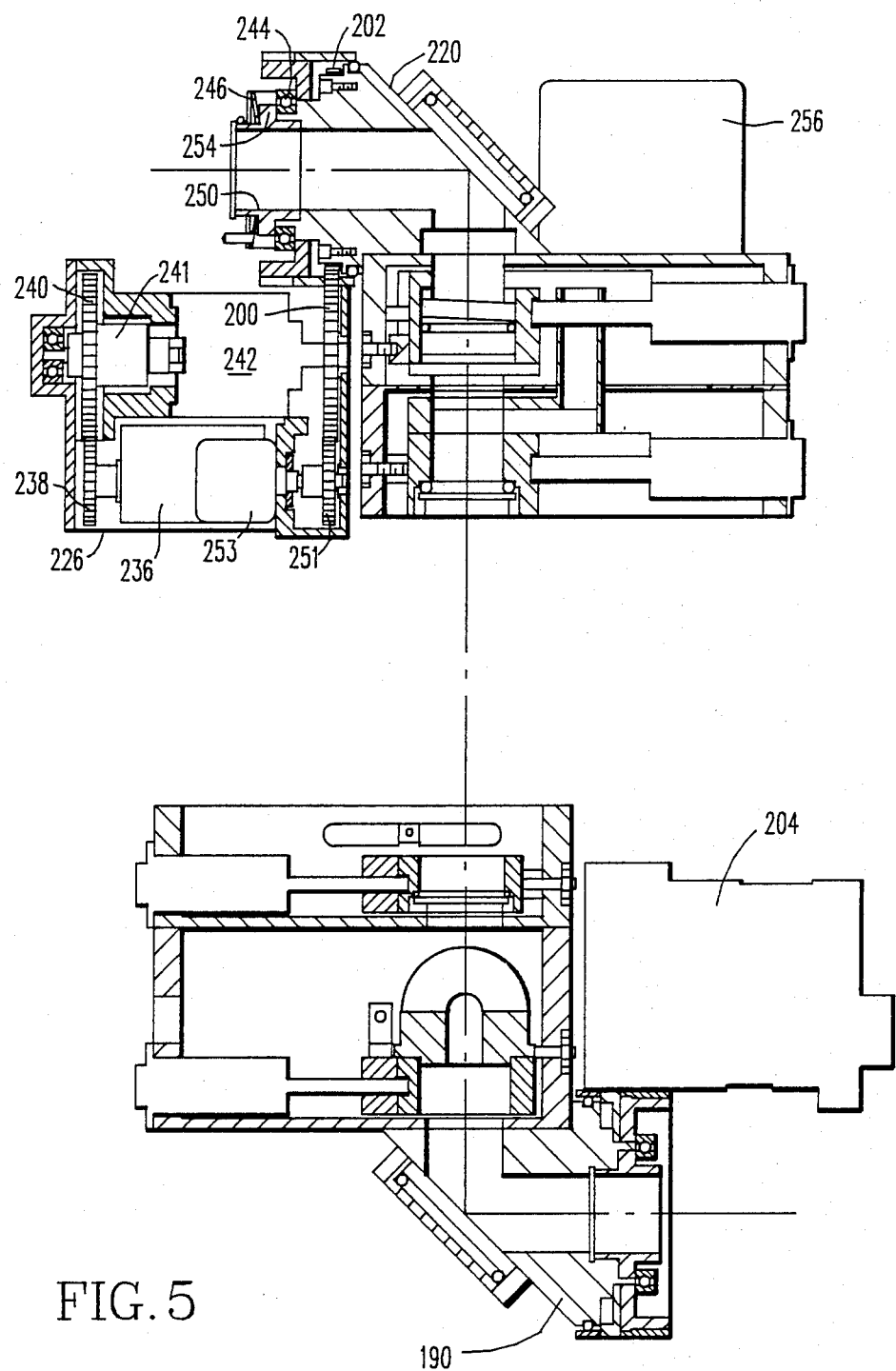
FIG. 5 illustrates a portion of the laser welding apparatus of FIGS. 4A and 4B, showing details of the laser detectors and motor drives for the wrist mechanisms.

The four drive assemblies 198, 204, 226 and 247 are identical and, referring to FIG. 5, include a drive motor 236, an output gear 238, an intermediate gear 240, a slip clutch 241 and a planetary gear 242, the output of which is coupled to output gear 200. The gear 200 is in turn is coupled to the ring gear 202 in each respective wrist (188, 190, 220 and 222) described above. Slip clutch 241 is provided in order to prevent damage to the system if the wrist 188, 190 220 or 222 strikes an obstacle.

In order to maintain stability of the apparatus of the present invention, it is necessary to assure that the wrists 188, 190, 220 and 222 remain in place when positioned. In accordance with the present invention, the movable portion of each wrist 188, 190, 220 and 222 is secured to the next adjacent assembly by means of a suitable captured bearing 244 and a pinned belleville washer 246 (see, for example, wrists 220–222 in FIG. 4B). The captured bearing 244 is located between an extension 248 of the fourth wrist 222 and a flange portion 250 of the third wrist 220, as shown. The pinned belleville washer 246 is captured between the flange 250 and a corresponding opposing face 252 of the fourth wrist 222. The pin 254 locates the belleville washer 246 so that it turns with the third wrist. The belleville washer 246 provides friction for maintaining the wrists 220 and 222 in position once the drive 226 is terminated. In this connection, it should be understood that once a wrist is positioned, the particular drive for the wrist is reversed for a sufficient number of counts to relieve any residual pressure of the output gear 200 on the ring gear 202 so that the wrist does not tend to drift from its desired position. The belleville washer 246 is pinned, as shown, so that variations in the shape and size of the washer do not create inaccuracies in the alignment of the wrists 220, 222 and associated equipment should the washer be allowed to drift from its position. It should be understood that the fourth wrist 222 is coupled to the beam reducer 224 by a similar configuration, as are the first and second wrists described earlier.

Each drive 198, 204, 226 and 247 also includes a potentiometer 253 which is coupled to the output gear 200 by a coupling gear 251. The rotational position of potentiometer 253 gives a rough indication of the location orientation of the particular wrist. An output of the potentiometer 253 is used to roughly gage the position of each wrist in the system.

The transmitter 74 (FIG. 4A) carries a transmitter video camera 252 which is roughly directed in the anticipated direction of the receiver 76. Likewise the receiver 76 (FIG. 4B) carries a small receiver video camera 256 which is oriented in the general direction of the transmitter 74. When aligning the transmitter 74 and the receiver 76, the operator can look for the low power beam 122 (FIG. 3) on adjacent structures and at the same time look for the receiver 76 and converge the two. Similarly, the operator may control the operation of the receiver 76 and move it in the direction of the transmitter 74 by observing the reflected beam 144. (FIG. 3) and direct it towards the transmitter 74. Each of the motors 236 in the various motor assemblies hereinbefore described are high precision stepper motors such as Clifton Precision model 11-SHBD-47AB which have been assigned 732,000 steps per 360° wrist rotation or 0.6 steps per second of arc rotation. The motors 236 are controlled by a computer (e.g., CPU 158 in FIG. 3) which keeps track of the number of counts for extremely precise positioning of the motor and thus the associated wrist assembly.

When conditions permit, the high power laser 72 may be bolted directly to the manway flange 160 as shown in FIG. 4A. However, when adjacent structures interfere, the high power laser 72 may be rotated to any convenient location with respect to the manway flange 160 by means of the bolt circle 162. The bolt circles 185 and 187 on the mirror box 172 and mirror housing 184 are indexed with respect to the bolt circle 162 on the manway flange 160. Thus, when selected bolt holes on the manway flange 160 are used to secure the laser 72 to the steam generator 50, the relative position of the mirror box 172 and the mirror housing 184 are adjusted to a corresponding predetermined relationship by means of the bolt circle 185 and 187. Thus, the transmitter 74 is always located at a known orientation in the manway opening 52 which is called the home position. All measurements of the system are determined from the home position of the transmitter 74.

Figure 4C:
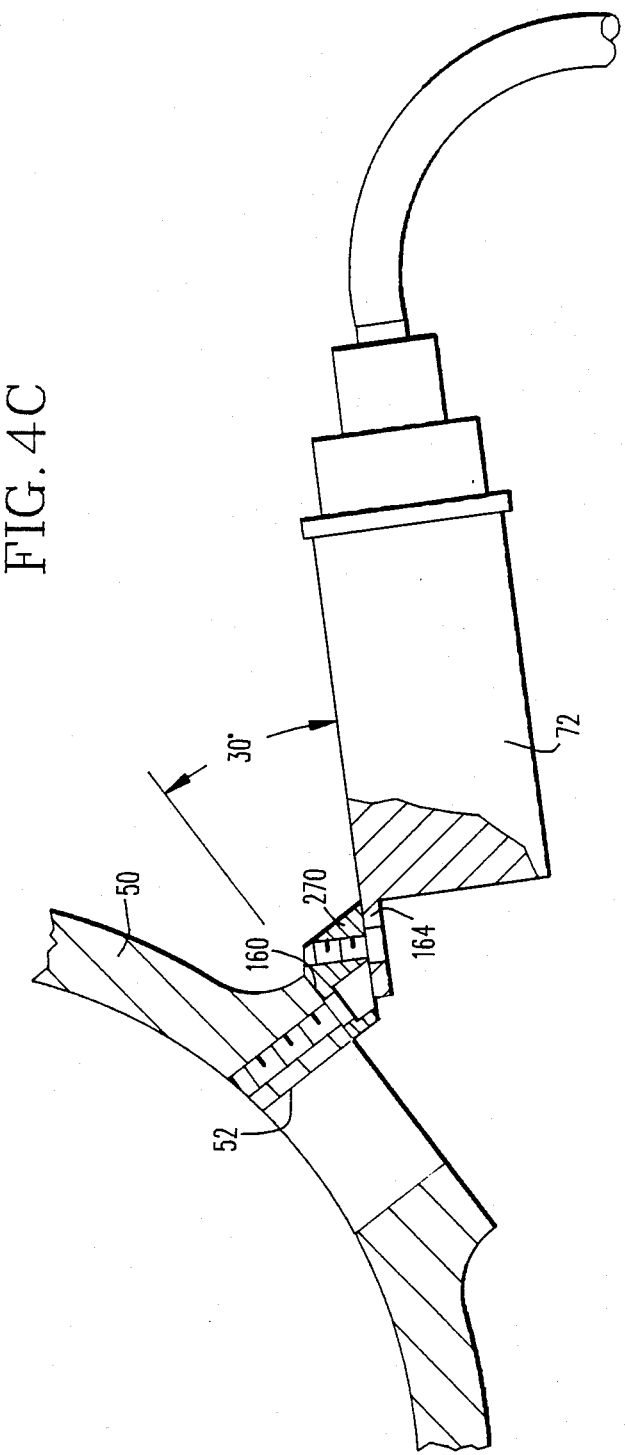
FIG. 4C illustrates an alternative mounting configuration for the high power laser.

In accordance with the invention it is also possible and often desirable to re-orient the laser 72 with respect to the manway opening. FIG. 4C shows such an arrangement in which a tapered shim 270 is located between the bracket 164 and the manway flange 160. The tapered shim 270 reorients the laser 72, in the case shown in FIG. 4C, by 30° relative to the plane of the manway flange 160. When the laser 72 is so oriented, it is necessary to reorient or adjust the steering mirrors 82 and 84 inasmuch as the position of the laser 72 with respect to the mirror box 172 may not be exactly the same as in the arrangement illustrated in FIG. 4A. Under certain circumstances it may be necessary to shift the position of the laser 72 and transmitter 74 in the manway opening 52. For this purpose, one or more simple flat shims 272 may be used as illustrated in FIG. 4A.

Figure 13:
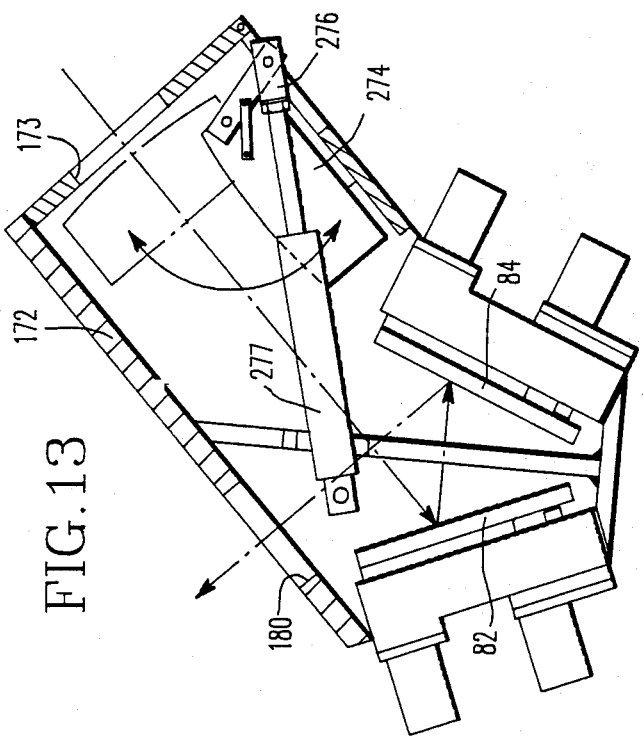
FIG. 13 is a side elevation of the steering mirrors and movable power meter illustrated in FIG. 4A.

A power detector 274 (FIGS. 2, 4A and 13) is retractably located in the path of the high power laser. The power detector 274 is used to fine tune the operation of the laser 72 and is retracted by rotating the detector about the pivotable mount 276 by means of pneumatic linkage 277 secured to the mirror box 172 (FIG. 13).

A laser alignment apparatus 278 is located on the bracket 170 as shown in FIGS. 2 and 4A. The laser alignment apparatus 278 receives the laser beam from the high power laser 72 and is utilized to provide laser adjustment information which the operator can utilize to adjust the cavity mirrors (not shown) inside the high power laser 72.

Figure 7:
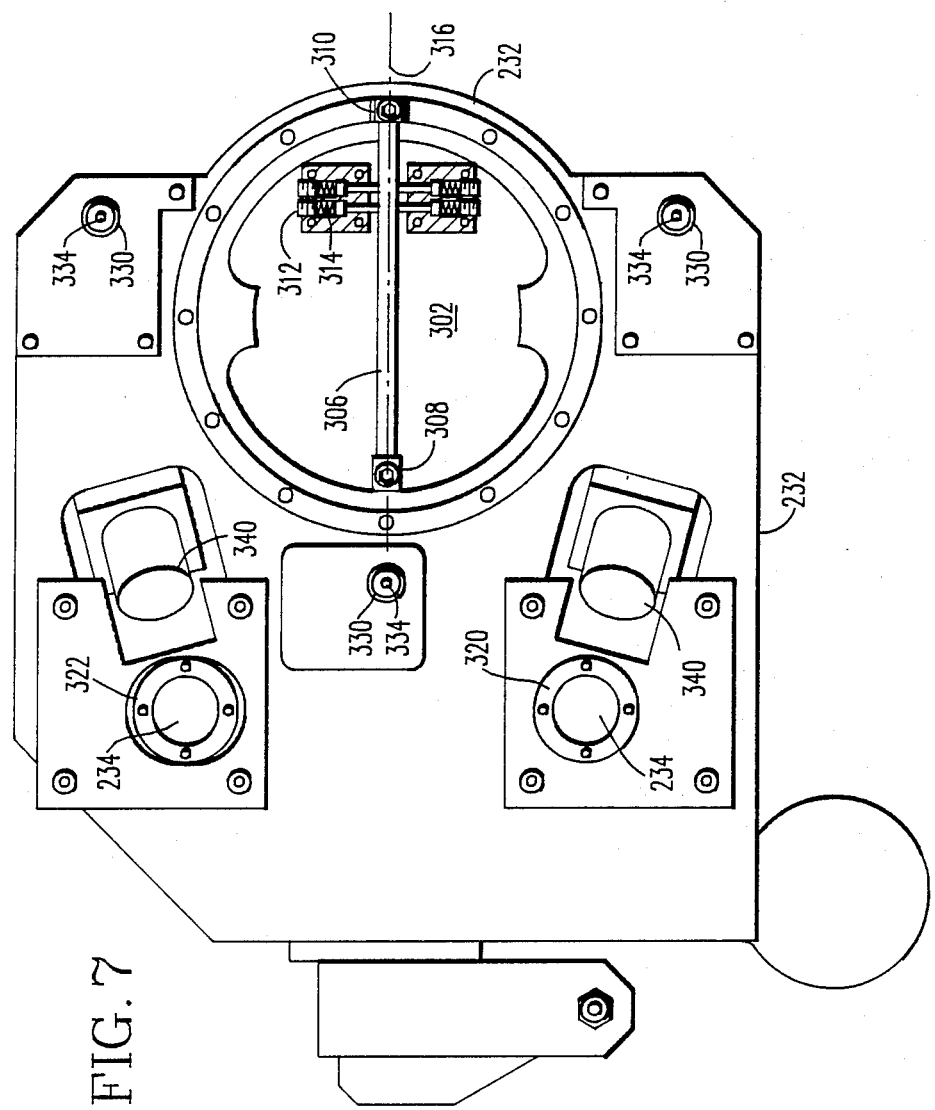
FIG. 7 is a top plan view of the support illustrated in FIG. 6.

The cam plate 232 which supports the receiver 76 and the welding head 228 is shown in detail in FIGS 6 and 7. The cam plate 232 is adapted to be carried by a robot arm (not shown) by means of a cylindrical coupler 300. The coupler 300 is located in a circular opening 302 in the cam plate 232 and is carried therein by bearings 304. A centering bar 306 is secured at one end to the upper side of the coupler 300 at pin connection 308. The other end of the centering bar 306 is coupled to the cam plate 232 by pin connection 310. The coupler 300 is thus restricted to a very limited amount of rotational movement within the opening 302. Opposed biasing members 312 are mounted on an upper surface 313 of the coupler 300 and include spring loaded pins 314 which engage opposite sides of the centering bar 306, urging it into normal alignment with the center line 316 of the diameter of coupler 300. The flexibility thus provided to the centering bar 306 allows the cam locks 234 carried by the cam plate 232 to engage holes in the tube sheet with the degree of flexibility and tolerance necessary for industrial purposes, yet provides a very accurate centering of the cam plate 232 with respect to the robot arm which carries it into position.

In this connection, reference is directed to the top view in FIG. 7 where a pair of the cam locks 234 are shown. In the drawing, the lower one of the cam locks 234 is located in an aperture 320 which is circular and matches the cam lock 234 precisely. The upper cam lock 234 in FIG. 7, however, is mounted in an aperture 322 which has a slightly oval shape and which allows the upper cam lock to move laterally with respect to the cam plate 232. Thus, if the tube sheet holes do not exactly match the spacing of the cam locks 234, a degree of lateral freedom is provided which allows relative lateral movement of the cam locks 234 as they are inserted into the tube sheet. Likewise, the flexibility afforded the coupling 300 by the centering bar 306 permits insertion and retraction of the cam locks 234 into the tube holes and accurate placement of the cam plate against the tube sheet. This allows the weld head 228 to engage the sleeve and tube to be welded (FIGS. 2 and 6).

In order to further assure that the cam plate 232 is solidly engaged against the tube sheet 54, telescopic feelers 330 are provided. The telescopic feelers 330 are biased to extend away from the upper surface 332 of the cam plate 232. The upper tip 334 of each feeler 330 engages the tube sheet 54 as the robot arm manipulates the cam plate 232, the weld head 228 and the receiver 76 to various tube locations. As the cam plate 232 is positioned adjacent the tube sheet 54 and the cam locks 234 are located and locked in position, the upper end 334 of the feeler 332 engages the tube sheet 54 while the upward movement of the cam plate 232 causes the feelers 330 to be compressed. A potentiometer (not shown) associated with each feeler 330 provides an output which indicates the degree of compression and thus the alignment of the cam plate 232 with the tube sheet 54. When each of the three feelers 330 is fully compressed, the cam plate 232 is properly positioned. In order to further assist the operator of the system to properly locate the receiver 76, video cameras 338 are located on the underside of the cam plate 232 and view the cam locks 234 through viewing ports 340.

Figure 9:
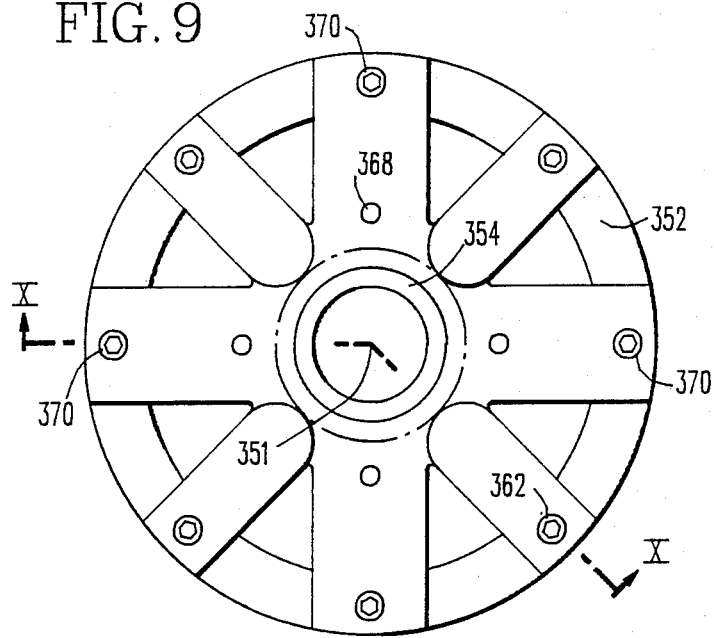
FIG. 9 is a top plan view of an alignment mechanism for adjusting the position of the weld head with respect to an axis of rotation.
Figure 10:
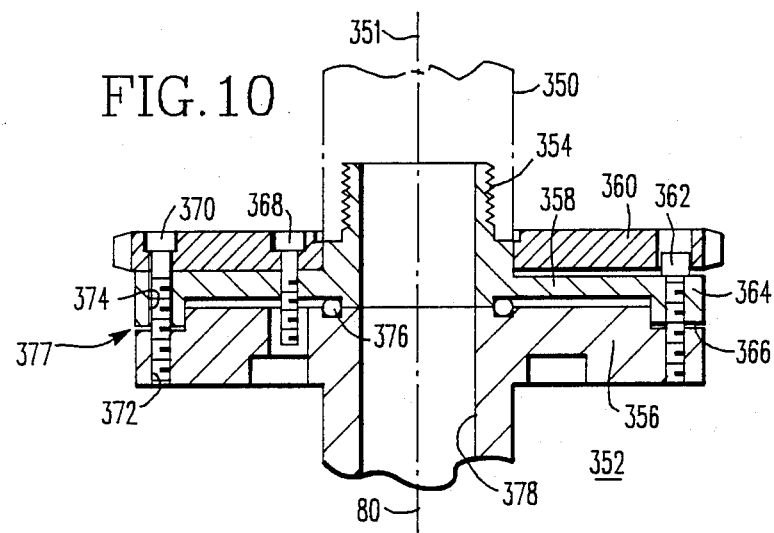
FIG. 10 is a side sectional elevation of the adjustment mechanism illustrated in FIG. 9.

In order to assure that the welding head 228 is properly aligned with the tube and sleeve 56 and 58, the weld head 228 has a special mounting illustrated in FIGS. 6, 9 and 10. The weld head 228 includes a tube portion 350 which is mounted on a rotatable base 352. The rotatable base is driven by a motor (not shown). The weld tube 350 is threadably secured to a threaded projection 354 on the base 352. Because of the accuracies required for welding sleeves into the tubes of nuclear steam generators, the base 352 is constructed with a floating bearing so that the welding tube 350 is properly aligned with the laser beam 80 along the central axis 351 of the tube 350. FIG. 10 shows an offset cross-section of the base 352 taken along line 10—10 of FIG. 9. The base 352 includes a lower drive member 356 which is driven by a motor (not shown), a driven member 358 and an adjusting plate 360. The driven member 358 which carries the threaded projection 354 is secured to the drive member 356 by screws 362. A depending edge 364 of the driven member 358 abuts a corresponding upper surface 366 of the drive member 356 as shown in FIG. 10. The adjusting plate 360 is mounted over the driven member 356 and is secured thereto by means of inboard bolts 368. The adjusting plate 360 is also secured to the drive member 356 by means of bolts 370 which are threaded into threaded apertures 372 of the drive plate 356. Apertures 374 in the driven member 358 are oversized and the bolts 370 slidably pass therethrough. In addition, the depending edge 364 of the driven member 358 is spaced from the driven member at the bolt locations 370, as indicated by the arrow 377. The operator may adjust the tension on the bolts 370 and thereby draw the driven member 358 against the drive member 356. This permits the alignment of the welding tube 350 to be adjusted with respect to the beam 80. Adjustment of the tension on each of the bolts 370 is thus useful to finally adjust the alignment of the welding tube 350 with the axis of the beam, as shown. During welding operations, the interior chamber 378 of the welding tube 350 receives a purge or shielding gas. An O-ring 376 seals the chamber 378 through which the purge gas is provided.

Figure 8:
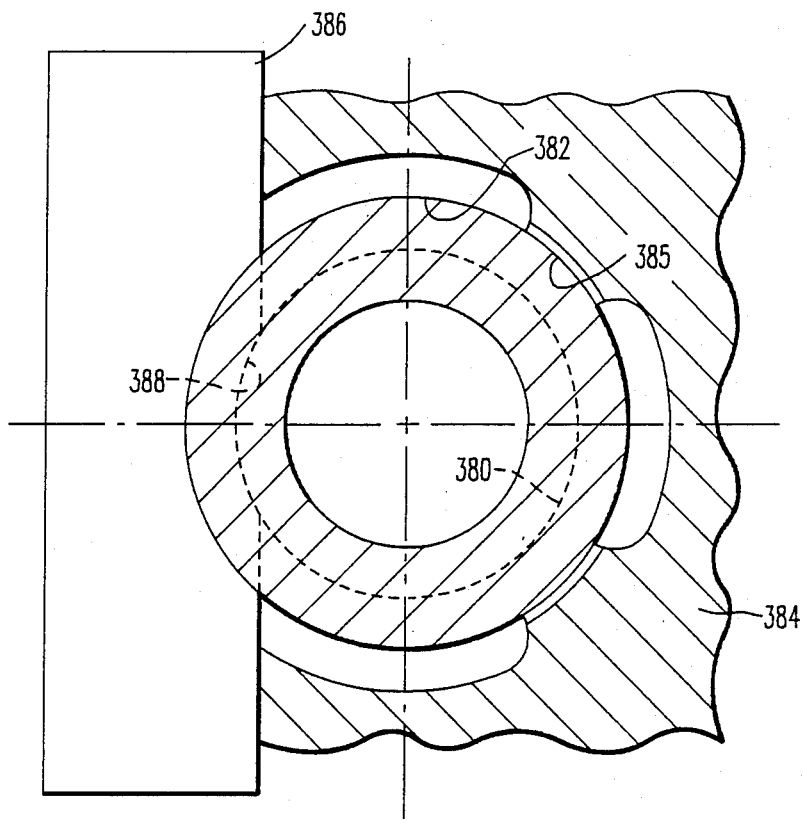
FIG. 8 is a sectional elevation of a bearing taken along lines 8—8 of FIG. 6.

The lower end of the drive member 356 has a threaded portion 380 and upper and lower bearing members mounted in a "V" bearing 384 (see FIGS. 6 and 8). The bearing surfaces 382 of the drive members 356 engage the upper and lower opposed surfaces 385 of "V" bearing 384. Opposed surfaces 385 are in the form of flat segment of a circular bearing. Opposite the "V" bearing surface 384 is a threaded bar 386 which is spring biased against the threaded portion 380 of the lower end of the drive member 356. The threaded bar 386 has a threaded portion 388 which mates with the threaded portion 380 of the driven member. The threaded bar 386 is suitably secured by spring biasing or the like in the direction of the segmented bearing surfaces 385 to cause the drive member 356 to be rotatably yet tightly secured in the bearing 384. The bearing 384 has a cylindrical recess 390 for receiving the upper and lower bearings 382 therein. The recess 390 is elongated and allows the upper and lower bearings 382 to move axially therein. When the weld head 228 is rotated, the drive member 356 rotates against the threads of the threaded bar 386 and the weld head 228 moves upwardly or downwardly during the welding operation. Thus, the upper and lower bearings 382 not only engage the segmented bearings 384 for rotational movement, but also are free to move up and down as is apparent in FIG. 6. During a welding operation, the weld tube 350 is rotated by the motor (not shown) and forms a helical weld within the tube and sleeve 56, 58. After each welding operation, the direction of the weld tube is reversed and the bearing 382 moves to the lower home position.

Figure 11:
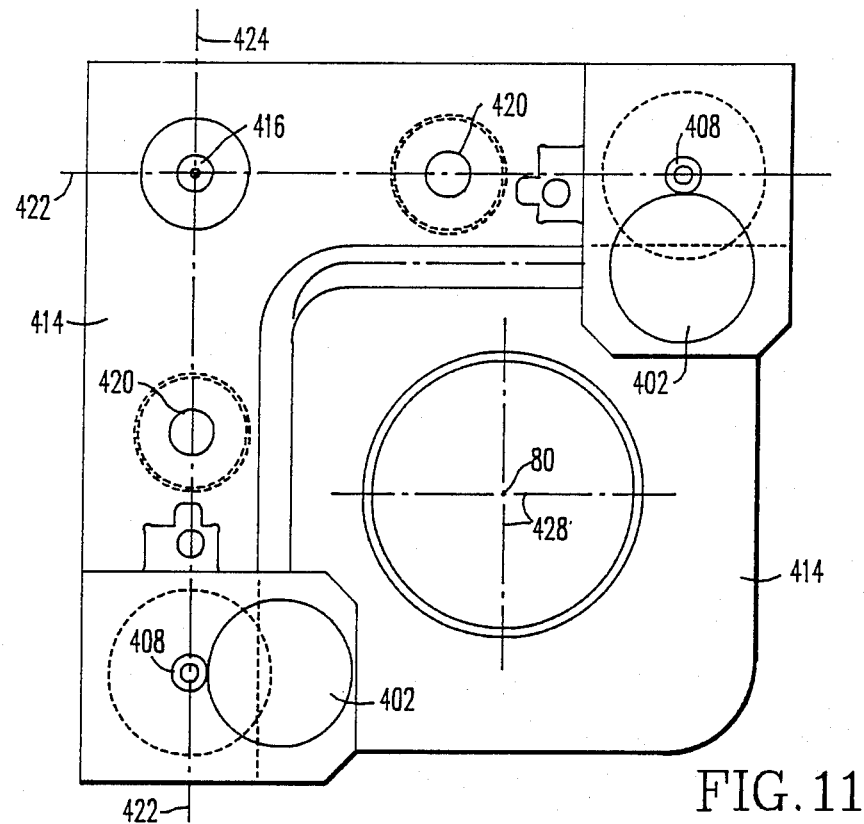
FIG. 11 is a top plan view of the steering mirror mechanism illustrated in FIG. 4A.
Figure 12:
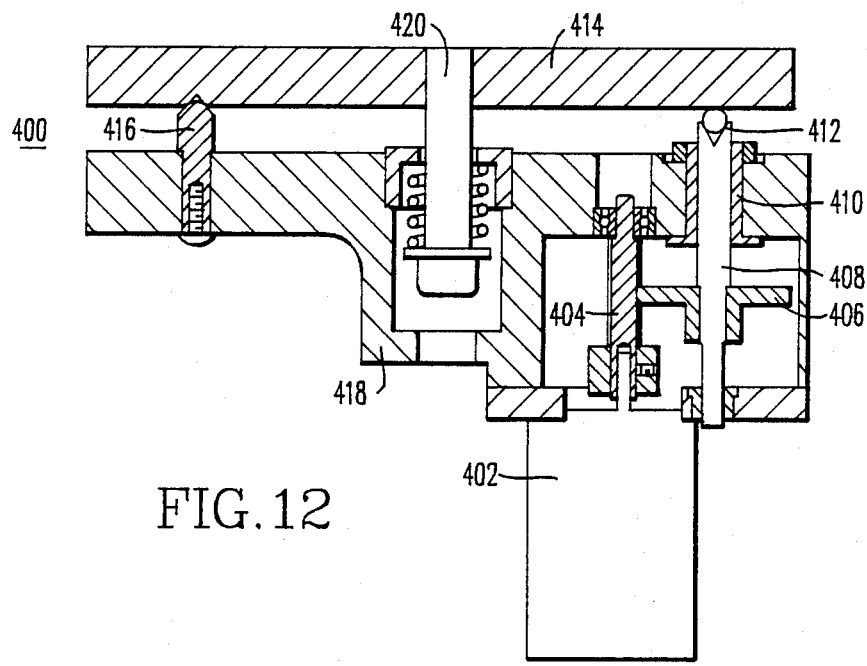
FIG. 12 is a sectional elevation taken along line 12—12 in FIG. 11.

FIGS. 11 and 12 illustrate in respective plan and sectional views steering mirror drives 400 for the steering mirrors 82 and 84 illustrated in FIGS. 2, 4A and 13. The steering mirror drives 400 include a drive motor 402 which has a geared output 404 that drives a gear 406 and interconnected lead screw 408, the latter mounted in a threaded bore 410. As the motor 402 rotates clockwise, or counter-clockwise, the gear 404 drives the gear 406 and lead screw 408 up or down as the case may be. The upper end of the threaded lead screw 408 carries a ball bearing 412. A mirror plate 414 is pivotably driven by the lead screw 408 about a pivot 416. The mirror plate 414 is secured to the frame or motor base 418 by a spring loaded pin 420. FIG. 11 illustrates that two sets of motors 402, lead screws 408 and spring loaded pins 420 drive the mirror plate 414 about perpendicular axes 422 and 424, which cross at the pivot pin location 416, as shown. The steering mirrors 82 and 84 are thus steerably mounted and may direct laser energy and center the same at the intersection of the center lines 428, which corresponds to the desired beam location 80.

In accordance with the present invention, alignment of the transmitter 74 and the receiver 76 is accomplished by a sequence of manual steps and by a sequence of computer controlled automatic steps described below. Visual alignment of the transmitter 74 and receiver 76 is accomplished viewing the visible laser beam 122 and the reflected laser beam 144 (FIG. 3) with the video cameras 252 and 256 (FIGS. 4A-4B and 5). Rough manual alignment is achieved after visual alignment when the low power laser beam 122 falls somewhere on transmitter detector 150, and the reflected beam 144 falls somewhere on the receiver detector 148 (FIG. 3). The operator can set each motor 236 in drives 198, 204, 242, and 247 (FIG. 2, 4A, and 4B) to a selected count by steps measured from their respective visually achieved positions so that the transmitter 74 and receiver 76 are roughly aligned. After the transmitter 74 and receiver 76 are thus roughly aligned, the CPU 158, using stored mathematic relationships derived from the geometric and kinematic relationships as described in *Robot Manipulations: Mathematics, Programming and Control* by Richard P. Paul (M.I.T. 1981), aligns each beam 122 and 144 in a selected "starting block" which has a relatively coarse tolerance. The motors 236 are thereafter activated to cause drives 198, 204, 226 and 247 to move away from the starting block and away from the desired final location in alignment condition in order to load full backlash into the system. Thereafter the motors 236 are reversed, causing drives 198, 204, 242 and 247 to thereby reverse direction in order to reduce as much as possible all backlash from the system in the direction of alignment. Thus, beams 122 and 144 are first returned to the starting blocks and thereafter, by precise computer control, are moved in a programmed sequence to a precise desired alignment position.

The computer program controls the final alignment process. Several critical factors are taken into account by the computer program in the alignment procedure which is described below.

Each of the four wrists 188, 190, 220 and 222 is aligned by its corresponding drive 198, 204, 242 and 247 and by stepper motors 236 capable of being precisely controlled. The mirror housings and motors use lubricated gears which have been described. Because alignment of the laser must be precise, even the gear lubrication must be considered. When a motor 236 is reversed in direction, gears (e.g., gears 238, 240, 242, 200 and 200 in FIG. 4B) change direction. Gear contact is not without some tolerance known as backlash between the gear teeth contact. Therefore, a particular driven gear does not respond immediately or precisely to the driving gear after the direction of rotation has been reversed. In the present invention, the requirement for precision is so great that even the effect of lubricant between gear teeth is considered when calculating and dealing with backlash. For example, before gear teeth actually touch after a reversal, the lubricant must be displaced, depending on conditions of operation. The amount of residual film in the gear teeth may be different after each gear change. Thus, the backlash is not always predictable to the accuracy required. In accordance with the program control afforded by the present invention, after gear reversal, when all except a thin layer of lubricant is displaced, the gears firmly contact each other. Thereafter the wrist movements may be accurately controlled through motor movement.

Figure 14:
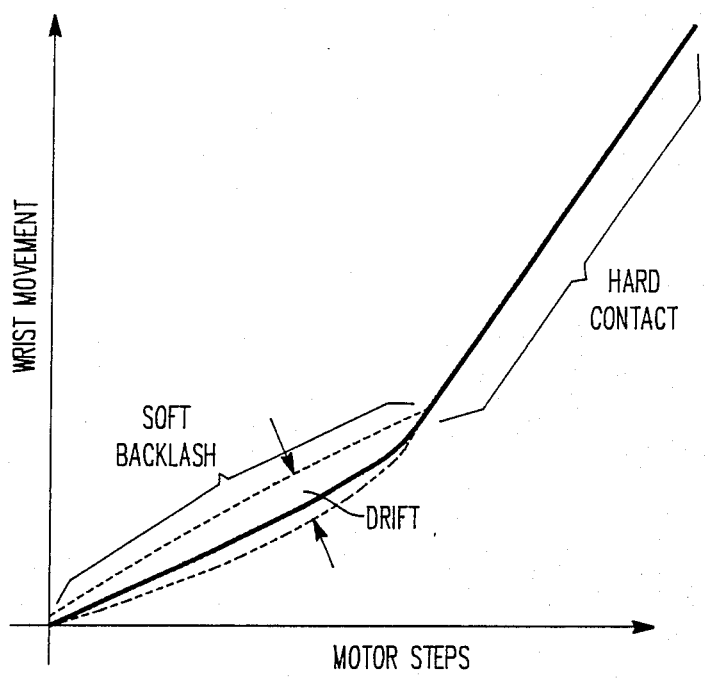
FIG. 14 is a graphical representation of the hard contact and soft backlash conditions.
Figure 15:
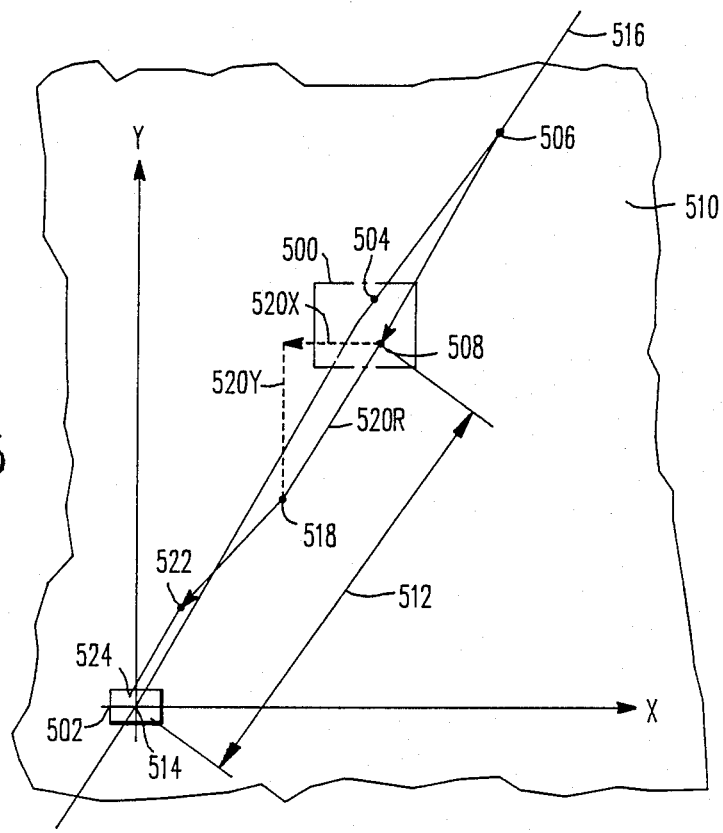
FIG. 15 is a graphical representation of a typical movement pattern of the alignment beam beginning at the starting block and terminating at the alignment position.

The term "soft backlash" is used to describe the range of gear travel necessary to displace lubricant between two gears such that the response of the driven gear to the drive gear may be predictable. The term "hard contact" refers to the condition of firm contact between the gears. The movement required to move from the "soft backlash" to the "hard contact" condition is determined prior to operation of the system and is taken into account during the actual alignment process. For instance, depending upon the condition of the lubrication, and how worn the gear teeth are, when the direction of wrist rotation is reversed, the driven gear will respond to actuation for a certain number of motor steps. However, the measured displacement of the wrist will not have a linear relationship with the movement of the motor. The non-linear relationship is the soft backlash. Thereafter, when a linear relationship between the motor steps and the rotation of the wrist has been established, the hard contact condition has been achieved. In addition, both the linear and non-linear relationship may drift as illustrated in FIG. 14. Nevertheless, the computer program assigns a given number of motor steps to transition from the soft backlash to the hard contact condition during an alignment procedure. The program accurately predicts the current assignment of values and accurate alignment is achieved. If these factors are not considered, overshooting and target misalignment occurs. Backlash can be automatically measured and stored by the CPU. Using the detector for position feedback, the CPU reverses motor direction and measures the amount of motor steps to induce motion of the detector surface. FIG. 15 is a graphical representation of such a measurement.

In the present invention the beam is located in the starting Block 500 and move through a sequence of proposed steps to the alignment position 502. The beam is first located at position 504 in the starting block 500. The motors are rotated in a direction opposite the direction of the alignment position 502 by a predicted number of motor steps, causing the gears to engage in hard contact and moving the beam to position 506. Next, the motors are reversed to rotate the wrists by the number of motor steps required to put the gears back into hard contact, bringing the laser beam somewhere into the starting block 500, e.g., at position 508. This is done so that the gears will be in the hard contact condition for the duration of the final alignment procedure which follows. When the system has been placed in the condition established at position 508, all driven gears are fully responsive to its corresponding drive gear.

In addition to the soft and hard contact conditions, another problem with the gear system has been observed. Due to torsion and the transmitted torque associated with a gear driven system, a certain amount of wind up or residual stress can build up in a gear train. This wind up or stress may be released at any time and the wrist may rotate or drift from its set position. In terms of aligning a sensitive and precise system such as the laser alignment system of the present invention, drift can result in a misaligned laser beam and damage to expensive equipment. Therefore, before final alignment, the gears are unloaded by reversing the motors 236 a few steps. There is also a 10 msec delay between the last movement of the gears and the taking of a position reading to insure all movement has ceased.

The transmitter 74 and receiver 76 may be configured in any of four of the following positions looking from the transmitter 74 to the receiver 76:

(1) Transmitter 74 is to the left of center, and receiver 76 is to the left of center.
(2) Transmitter 74 is to the left of center, and receiver 76 is to the right of center.
(3) Transmitter 74 is to the right of center, and receiver 76 is to the left of center.
(4) Transmitter 74 is to the right of center, and receiver 76 is to the right of center.

These four geometric configurations provide great flexibility in terms of the ability of the system to transmit and receive the laser beam in any particular position or direct the laser beam around any obstruction within the steam generator. The initial configuration of the transmitter 74 and receiver 76 must be known in order to insure that during computer manipulation, the motors 236 rotate each wrist in the desired direction.

The bearing 244 for each wrist 188, 190, 220, and 222 in FIG. 4A-4B is not located in the same plane as wrist ring gear 202, and hence the wrist axis will deflect with respect to the beam 80 in a direction opposite the rotation of the ring gear 202, when the drive gear 200 rotates. If the rotational direction of drive gear 200 is reversed, the above-noted deflection is reversed. Compensation for such deflection in the transmitter 74 is not necessary as the low power alignment laser beam 122 and the high power laser beam 80 are fixed in the same path before they enter the wrists 188 and 190. However, the deflection has a particular effect in the alignment of the beam 80 through the receiver 76. In the receiver, compensation for deflection is achieved by fixing wrist rotation in one direction during the alignment procedure. In other words, during the final approach from the starting block 500 at position 508 to the alignment position 502 in the alignment procedure, the receiver motors 236 are rotated the same direction.

The starting block 500 (FIG. 15) is an assigned area in a detector 510 (for example, transmitter detector 150 or receiver detector 148 in FIG. 3). The starting block 500 is located at a point some distance 512 away from the center 514 of each detector 510. The starting block 500 is situated along a line 516 lying at 45 degrees with respect to the center 514 of the detector 510. By rotating each wrist 198, 200, 220 and 222, the beams 122 and 144 may be positioned at or near the center 514 of the detector 510 within the small alignment area 502. The starting block 500 is positioned in FIG. 15 with respect to the rotational axis of the wrist. The position of the starting block 500 is established by the computer 158 (FIG. 3) with respect to the center 514 of the detector 510. The computer 158 takes into consideration the initial transmitter 74 and receiver 76 configuration and any restrictions on the direction of rotation of any motors 236 (FIGS. 4B and 5). The center 514 of each detector 510 coincides with the optimum laser path during welding.

The computer 158 provides instructions in the form of counts for the motors 236 to rotate the wrists to align the laser beams 122 and 144 near the center 504 of detector 506 in a series of steps. For example, movement from position 508 to position 518 is achieved by simultaneous rotation of all motors 236. The movements may be represented in FIG. 15 as perpendicular vectors 520-X and 520-Y parallel to the respective X-Y axes.

The resultant motion 520-R is the vector sum of all wrist movements. If the rotation of a particular wrist is greater or less than anticipated, the resulting position 518 of the beam is off the ideal line or path 516. The next movement from 518 to 522 is calculated to compensate for the overshoot (or undershoot). Finally, the alignment from position 522 to within the alignment area 502 at position 524 is achieved by a computer computation. If the beam 122 overshoots the alignment area 502 such that a motor reversal is required, the laser is repositioned in the starting block 500 and the aligning process is repeated. A series of small steps are taken, rather than a single step, to reduce the risk of overshooting the alignment area 502. After each step, the wrist motors are reverse rotated to unload the gears in order to eliminate the possibility of drift before the position detector signals are processed.

Figure 16A:
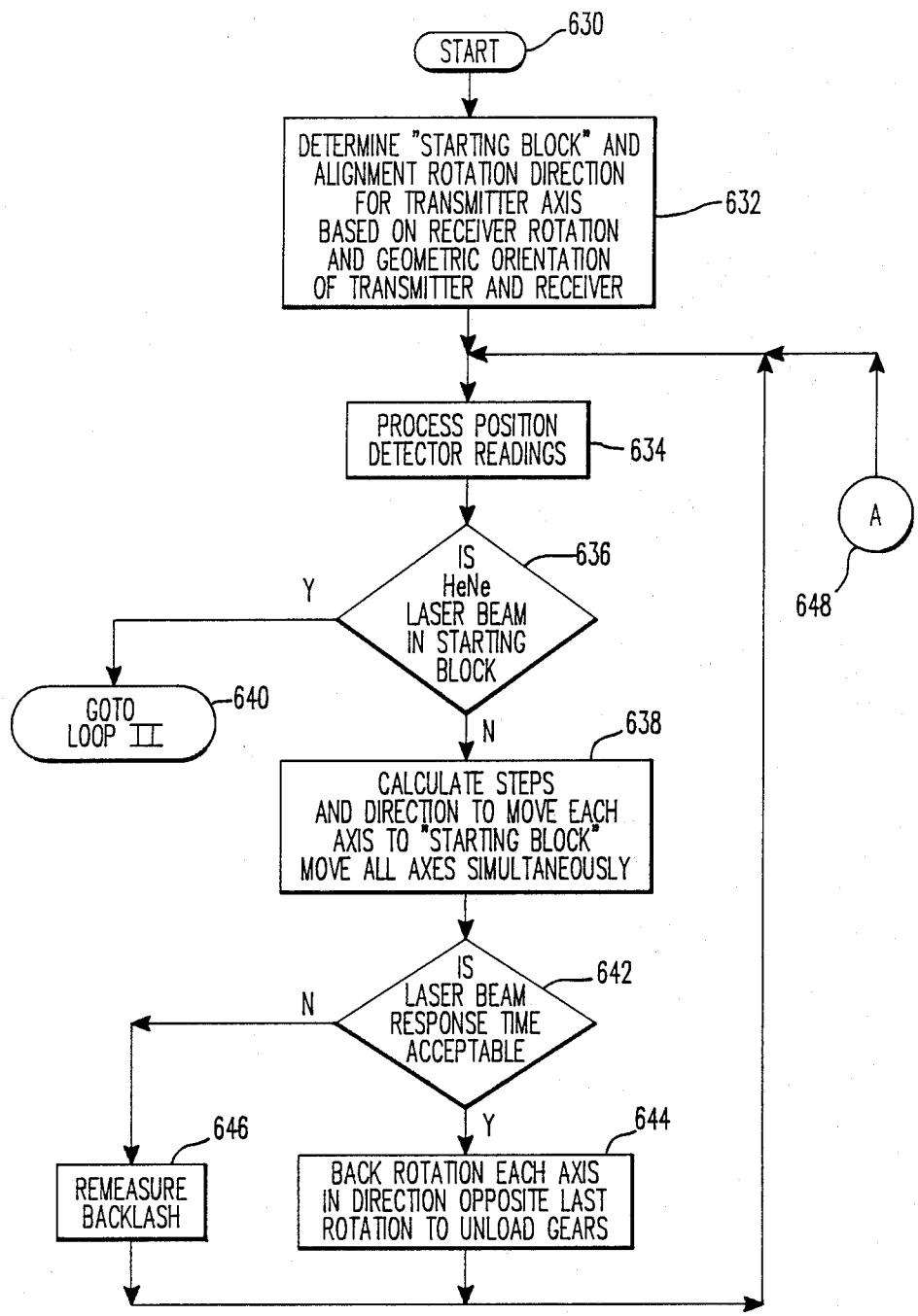
FIG. 16A–16C are flow charts of the process of aligning the transmitter and receiver of the laser beam alignment system of the present invention.
Figure 16B:
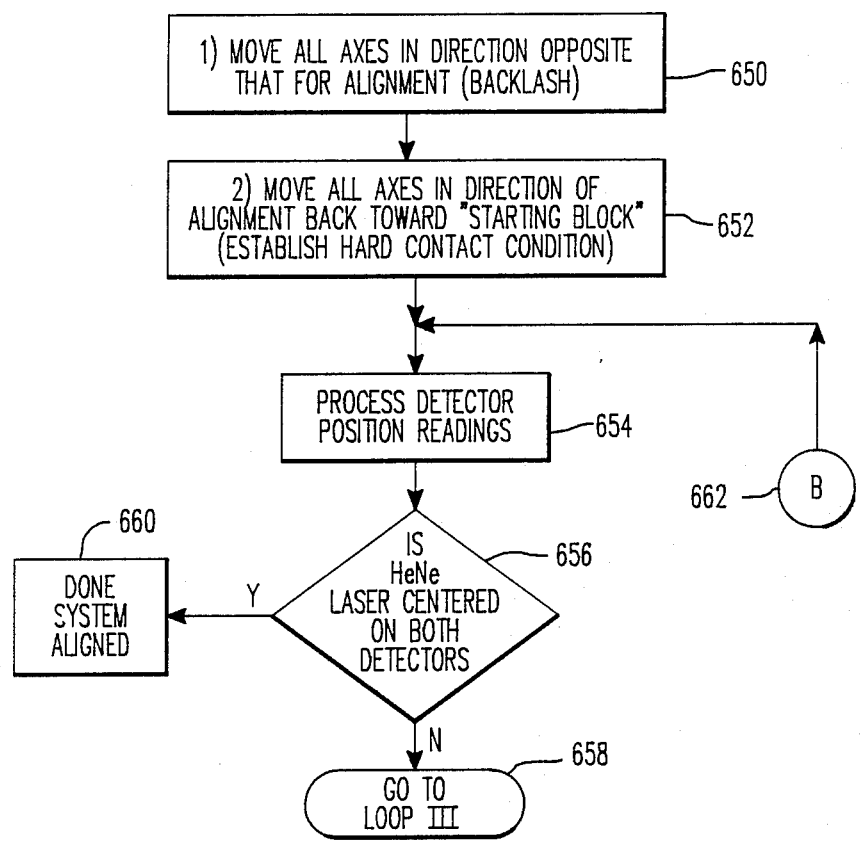
Figure 16C:
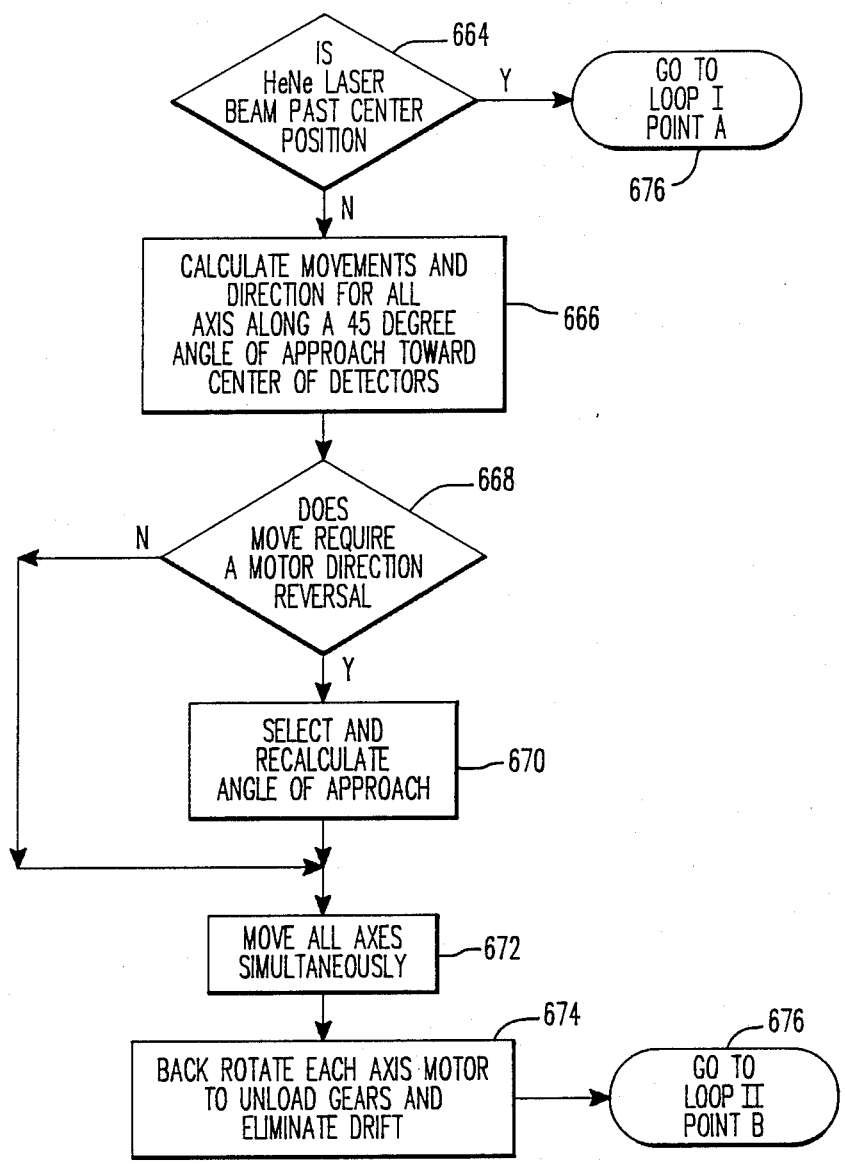

A flow chart of the computer program is shown FIGS. 16A–16C. After rough manual and visible alignment the computer control is implemented as follows. Loop I, FIG. 16A of the program, begins at START block 630. The starting block is determined by the computer at block 632. The determination is based upon the direction the receiver wrists rotate and the initial geometric orientation of the transmitter with respect to the receiver and the manway opening. The detector signals are processed at block 634 to establish starting position and alignment position. This signal is compared to the previously determined location of the starting block. If the laser beam is not located in the starting block as determined at block 636, calculations are made at block 638 to move the beam into it. The movement of all motors is also implemented simultaneously at block 638. If the laser beam response time is unacceptable as determined at block 642, the CPU remeasures the soft backlash condition of each motor at block 646 and returns to point A at block 648 for reprocessing at block 634. If the laser beam response is acceptable (block 642) the motors are reverse rotated to unload the gears at block 644, thus eliminating the possibility of drift. The computer returns to block 634. If the laser beam is located in the starting block as determined at block 636, the computer exits the loop I at 640 and proceeds to the loop II of the program, illustrated in FIG. 16B.

Loop II, FIG. 16B of the program, begins at block 650 by rotating all wrists in a direction opposite the direction necessary for aligning the beam. The rotation direction is then reversed at block 652 to bring the wrists back to the starting block position. This process is performed to assure the gear drives are in the hard contact condition. The position detector signals are thereafter processed at block 654 and used to determine whether or not the laser beam is aligned on the center of each detector. The number of steps the motors take in this operation varies. If the laser overshoots as determined by block 656, the computer temporarily leaves the loop II and begins loop III at block 658. If the laser beam is aligned according to block 656, control is returned to the operator at block 660.

Loop III, illustrated in FIG. 16C, begins at block 664 by comparing the position of the laser beam with the center of the detectors. If the laser beam is aimed at a point beyond the center of either detector (a point which will require a reversal in direction of rotation of any mirror housing) then the computer returns to the loop I at point A via block 666. If the laser beam is positioned between the starting block and the center each of the detectors, then movements are calculated in block 666 in order to bring the laser beam progressively closer to the center. A determination is made at block 668 as to whether the move requires a reversal in direction for any of the motors. Any move requiring such a reversal is ignored and a new destination is calculated and implemented in block 670. If no reversal is required, the program moves to block 672 where all axes are moved simultaneously. The motors are then reverse rotated to unload the gears in order to avoid drift at block 674. The computer then returns to the loop II at point B via block 662.

In accordance with the present invention, the above described arrangement provides a method of operation for aligning a laser beam to within about 2 mils accuracy over a span of about 10 feet. The accuracy is achieved using gear driven devices by means of a manually implemented prealignment sequence and a computer controlled precision alignment sequence.

While the invention has been described in connection with specific embodiments thereof, it will be understood that it is capable of further modifications. The claims are intended to cover any variations, uses or adaptations of the invention following, in general, the principles of the invention, and including such departures from the present disclosure as come within known and customary practice within the art to which the invention pertains.

What is claimed is:

1. A laser welding system in which a high power laser produces a laser beam for delivery to a weld site comprising:
    a transmitter and a spatially separated receiver, the transmitter being optically coupled to the laser and having an input for receiving the beam and having an output for directing the laser beam to the receiver, the receiver being optically coupled to the transmitter and having an input for receiving the directed laser beam and means for delivering the laser beam to the weld site;
    at least two pairs of directable beam deflecting means one pair in the transmitter and one pair in the receiver each pair of beam deflecting means operable in perpendicular planes for aligning the output of the transmitter and the input of the receiver;
    a pair of steering deflectors at the input of the transmitter for directing the laser beam toward the directable beam deflecting means of the transmitter;
    means for selectively mounting the laser in an orientation relative to the weld site; and
    means in the transmitter for selectively adjusting the orientation of the transmitter to an orientation corresponding to the orientation of the laser.

2. The laser welding system of claim 1, further including drive means for each of the beam deflecting means of the transmitter and the receiver for driving said beam deflecting means in order to align the input of the receiver with the output of the transmitter.

3. The laser welding system of claim 2, wherein the drive means each includes stepping motors each having about 400 steps per rotation and about 732,000 steps per wrist rotation.

4. The laser welding system of claim 2, wherein the drive means includes a stepping motor and a gear train.

5. The laser welding system of claim 2, further comprising control means operatively coupled to the drive means for the deflection means of said transmitter and said receiver, the control means operative to control the alignment of the transmitter and the receiver to an alignment position of a selected high tolerance from a selected starting position of relatively low tolerance, said control means producing outputs for operating each drive means in one direction from the starting position to the alignment position.

6. The laser welding system of claim 5, wherein the control means includes a programmed computer.

7. The laser welding system of claim 1, wherein each of the deflecting means includes a pair of interconnecting wrist members and reflectors mounted therein.

8. The laser welding system of claim 1, including means for adjustably supporting the receiver relative to the weld site.

9. The laser welding system of claim 8, wherein said means for adjustably supporting the receiver includes a torsional coupler comprising a support plate having an aperture therein, a collar sleeved in the aperture, and a spring-biased bar diametrically connecting the support plate with a diametrically remote portion of the collar, and spring means on opposite sides of the bar causing the collar to be normally biased to a position where the bar and the collar diameter are collinear.

10. The laser welding system of claim 8, wherein the weld site is a tube and sleeve in a steam generator tube sheet and the support plate includes a pair of cam locks for engaging the tubes, the cam locks being located in spaced apertures in the support plate, one of said apertures being oversized to allow lateral flexibility of one cam lock relative to the other and the adjustable support.

11. The laser welding system of claim 1, further including a low power alignment laser for producing a low power visible beam, said low power laser mounted in the transmitter and means for combining the high power laser beam with the low power visible beam including a window transparent to the high power laser beam and reflective of the low power beam, said window being mounted directly in the path of the high power beam which passes directly through the axis of the high power beam and the low power beam being directed at the window on the side where the high power beam has passed therethrough at a point corresponding to the central axis of the high power beam and at an angle such that the high power beam and low power beam are coaxially combined.

12. The laser welding system of claim 11 wherein the window has non-parallel first and second sides, the first side for combining the low power beam and high power beam, and the second side for reflecting extraneous laser energy off the main beam axis, and means near the output of the transmitter for restricting said deflected extraneous laser energy from reaching the receiver.

13. The laser welding system of claim 11, wherein the transmitter and receiver each include high power beam detectors and low power beam detectors each being slidably locatable in the path of the combined beams.

14. The laser welding system of claim 13, wherein the transmitter and receiver each include video cameras mounted thereon for viewing the low power detector of the other for permitting rough manual alignment of the transmitter and receiver.

15. The laser welding system of claim 1, further including a weld head for receiving the laser beam and directing it at the weld site in a helical pattern about a central axis of said weld head, said weld head including adjustable mount means for aligning the weld head with the axis.

16. The laser welding system of claim 15, wherein the adjustable mount includes a rotatable base for carrying the weld head, a weld head support abutting and secured to the base at selected radial locations and spaced therefrom at intermediate radial locations and an adjustment plate adjustably secured to the base through the support at the intermediate locations for adjusting the spacing between the base and support to thereby align the weld head to the central axis.

17. The laser welding system of claim 1, wherein the weld site is in a steam generator and the laser is located in an apertured manway thereof and the means for locating the base at the selected orientation includes a support for securing the transmitter and laser along an axis of the beam within the manway.

18. The laser welding system of claim 17, wherein the support is locatable in selected apertures of the manway.

19. The laser welding system of claim 18, further including means for adjusting the transmitter relative to the manway, including a support for the transmitter deflection means orientated in correspondence with the selected manway apertures utilized to support the laser.

20. The laser welding system of claim 17, wherein the support includes a wedge for supporting the laser at an angle relative to the transmitter.

21. The laser welding system of claim 20, further including a transmitter detector for the receiver for receiving low power laser energy from the transmitter and producing an output indicative of the position of the transmitter, and a receiver detector for the transmitter for receiving low power energy from the receiver and producing an output indicative of the position of the receiver.

22. A laser welding system of claim 21, wherein the detectors lie at an angle with respect to a central axis of the receiver and transmitter so that the low power laser is deflected therefrom.

23. A laser welding systems of claim 1 further including a microphone located in proximity to the weld site for providing audible indications of the welding operation.

24. A method of aligning a laser transmitter with a laser receiver, each having a detector appropriately positioned for receiving an alignment laser beam at a point which indicates alignment of said transmitter and receiver and each transmitter and receiver including steppable drive means for positioning the respective transmitter and receiver and which drive means has inherent backlash associated therewith which backlash is manifested by reversal of the drive means comprising the steps of:

aligning the laser at a starting block for each of the detectors on the receiver and the transmitter;

driving the drive means away from the alignment position by an amount sufficient to establish backlash in one direction; and directing the drive means to the starting position by actuation of the drive means in a single direction and thereafter driving the drive means from the starting position to the alignment position in sequential repetitive steps of actuating the drive means in said same direction.

25. The method of claim 24, further comprising the steps of reversing the drive means away from the alignment position and back to the starting position if the alignment laser overshoots the alignment position by an amount sufficient to require a drive means reversal in order to reach the alignment position.

26. The method of claim 24, further comprising the step of calculating the position of the alignment laser beam after each adjustment of the drive means in each sequential step.

27. The method of claim 26, further comprising the step of momentarily relieving the drive means during said measurements to relieve stress in the alignment system.

28. The method of claim 24, further comprising the steps measuring the number of steps necessary to overcome soft backlash condition and confirming hard gear contact if previous predicted soft backlash condition predictions do not yield hard contact movement.

29. The method of claim 24 further comprising the steps of: transporting a welding laser beam through the transmitter and receiver to a welding site for performing a welding operation and audibly monitoring the welding operation.

30. A laser welding system in which a high power laser produces a laser beam for delivery to a weld site comprising:
   a transmitter and a spatially separated receiver, the transmitter being optically coupled to the laser and having an input for receiving the beam and having an output for directing the laser beam to the receiver, the receiver being optically coupled to the transmitter and having an input for receiving the directed laser beam and means for delivering the laser beam to the weld site;
   at least two pairs of directable beam deflecting means one pair in the transmitter and one pair in the receiver each pair of beam deflecting means operable in perpendicular planes for aligning the output of the transmitter and the input of the receiver; and
   a pair of steering deflectors at the input of the transmitter for directing the laser beam toward the directable beam deflecting means of the transmitter.

31. A laser welding system in which a high power laser produces a laser beam for delivery to a weld site comprising:
   A transmitter and a spatially separated receiver, the transmitter being optically coupled to the laser and having an input for receiving the beam and having an output for directing the laser beam to the receiver, the receiver being optically coupled to the transmitter and having an input for receiving the directed laser beam and means for delivering the laser beam to the weld site;
   means for selectively mounting the laser in an orientation relative to the weld site; and
   means in the transmitter for selectively adjusting the orientation of the transmitter to an orientation corresponding to the orientation of the laser.

* * * * *